(12) United States Patent
Chen et al.

(10) Patent No.: US 12,051,166 B2
(45) Date of Patent: *Jul. 30, 2024

(54) APPARATUS, METHOD, AND SYSTEM FOR PRESENTATION OF MULTIMEDIA CONTENT INCLUDING AUGMENTED REALITY CONTENT

(71) Applicant: TIFF'S TREATS HOLDINGS, INC., Austin, TX (US)

(72) Inventors: Leon Chen, Austin, TX (US); Brian Keffer, Austin, TX (US); Jocelyn Seever, Austin, TX (US)

(73) Assignee: TIFF'S TREATS HOLDINGS, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/173,456

(22) Filed: Feb. 23, 2023

(65) Prior Publication Data

US 2023/0222747 A1    Jul. 13, 2023

Related U.S. Application Data

(63) Continuation of application No. 17/202,797, filed on Mar. 16, 2021, now Pat. No. 11,605,205, which is a
(Continued)

(51) Int. Cl.
G06T 19/00        (2011.01)
G06F 3/0482       (2013.01)
(Continued)

(52) U.S. Cl.
CPC .............. *G06T 19/006* (2013.01); *G06T 7/20* (2013.01); *G06T 7/70* (2017.01); *G06V 20/20* (2022.01);
(Continued)

(58) Field of Classification Search
None
See application file for complete search history.

(56) References Cited

U.S. PATENT DOCUMENTS 8,040,361 B2    10/2011   Bachelder et al.
8,315,432 B2    11/2012   Lefevre et al.
(Continued)

OTHER PUBLICATIONS

HTC Tutorials; "HTC Eye Experience—Show both sides of the story with Split Capture;" YouTube Video; Oct. 8, 2014, pp. 1-5; https://www.youtube.com/watch?v=ZitfGK8Gn1s (Year: 2014).*
(Continued)

*Primary Examiner* — Peter Hoang
(74) *Attorney, Agent, or Firm* — Norton Rose Fulbright US LLP

(57) ABSTRACT

The present disclosure relates to methods, devices, and systems for presentation of multimedia content. In an aspect of the present disclosure, a method includes receiving, at a processor of a mobile device, a plurality of images from a camera, at least one image of the plurality of images including an object. The method also includes displaying a camera video stream based on the plurality of images, displaying three dimensional (3D) augmented reality content in the camera video content, and displaying video content based on the 3D augmented reality content. The video content is associated with the object.

19 Claims, 14 Drawing Sheets

Related U.S. Application Data continuation of application No. 16/403,975, filed on May 6, 2019, now Pat. No. 10,984,600.

(60) Provisional application No. 62/676,748, filed on May 25, 2018.

(51) Int. Cl.
  *G06Q 10/08*  (2024.01)
  *G06T 7/20*  (2017.01)
  *G06T 7/70*  (2017.01)
  *G06V 20/20*  (2022.01)
  *H04M 1/72439*  (2021.01)

(52) U.S. Cl.
  CPC ....... *H04M 1/72439* (2021.01); *G06F 3/0482* (2013.01); *G06Q 10/08* (2013.01); *G06T 2207/10016* (2013.01); *G06T 2207/30204* (2013.01)

(56) References Cited

U.S. PATENT DOCUMENTS

| | | | |
|---|---|---|---|
| 8,332,424 B2 | 12/2012 | Flynn et al. |
| 8,335,400 B2 | 12/2012 | Kobayashi |
| 8,502,835 B1 | 8/2013 | Meehan |
| 8,547,401 B2 | 10/2013 | Mallinson et al. |
| 8,625,018 B2 | 1/2014 | Bilbrey et al. |
| 8,730,312 B2 | 5/2014 | Roebke et al. |
| 8,797,353 B2 | 8/2014 | Bregman-Amitai et al. |
| 8,965,460 B1 | 2/2015 | Rao et al. |
| 8,970,624 B2 | 3/2015 | Baseley et al. |
| 8,976,191 B1 | 3/2015 | Mendez Mendez |
| 8,982,110 B2 | 3/2015 | Saban et al. |
| 9,007,422 B1 | 4/2015 | Kwon et al. |
| 9,031,328 B2 | 5/2015 | Schonfeld et al. |
| 9,055,267 B2 | 6/2015 | Raghoebardajal et al. |
| 9,082,213 B2 | 7/2015 | Fujiki et al. |
| 9,111,378 B2 | 8/2015 | Chui et al. |
| 9,132,346 B2 | 9/2015 | Huebner |
| 9,147,291 B2 | 9/2015 | Xu et al. |
| 9,240,077 B1 | 1/2016 | Kraft et al. |
| 9,264,515 B2 | 2/2016 | Ganapathy et al. |
| 9,269,219 B2 | 2/2016 | Lyons et al. |
| 9,286,725 B2 | 3/2016 | Vasquez, II et al. |
| 9,292,085 B2 | 3/2016 | Bennett et al. |
| 9,311,741 B2 | 4/2016 | Rogers et al. |
| 9,323,323 B2 | 4/2016 | Aleksiev et al. |
| 9,336,629 B2 | 5/2016 | Finn et al. |
| 9,338,440 B2 | 5/2016 | Li et al. |
| 9,345,957 B2 | 5/2016 | Geisner et al. |
| 9,361,639 B2 | 6/2016 | Stauffer et al. |
| 9,396,588 B1 | 7/2016 | Li |
| 9,412,205 B2 | 8/2016 | Mullins et al. |
| 9,429,912 B2 | 8/2016 | Fleck et al. |
| 9,530,426 B1 | 12/2016 | Wright et al. |
| 9,536,352 B2 | 1/2017 | Anderson |
| 9,558,592 B2 | 1/2017 | Mullins et al. |
| 9,586,141 B2 | 3/2017 | Hardy et al. |
| 9,646,400 B2 | 5/2017 | Weerasinghe |
| 9,646,421 B2 | 5/2017 | Ayers et al. |
| 9,652,046 B2 | 5/2017 | Elmekies |
| 9,690,370 B2 | 6/2017 | Levesque et al. |
| 9,699,438 B2 | 7/2017 | Walsh |
| 9,704,298 B2 | 7/2017 | Espeset et al. |
| 9,724,609 B2 | 8/2017 | Kochi et al. |
| 9,741,145 B2 | 8/2017 | Mitchell et al. |
| 9,761,059 B2 | 9/2017 | Nistel et al. |
| 9,767,613 B1 | 9/2017 | Bedikian et al. |
| 9,791,917 B2 | 10/2017 | Kamhi et al. |
| 9,824,500 B2 | 11/2017 | Schoenberg |
| 9,846,965 B2 | 12/2017 | Mitchell et al. |
| 9,865,055 B2 | 1/2018 | Cole et al. |
| 9,898,844 B2 | 2/2018 | Mullins |
| 9,905,033 B1 | 2/2018 | Gray et al. |
| 9,911,231 B2 | 3/2018 | Subramanian et al. |
| 9,922,226 B1 | 3/2018 | Boyd et al. |
| 9,928,651 B2 | 3/2018 | Mariappan |
| 9,965,900 B2 | 5/2018 | Wojdala et al. |
| 10,181,210 B2 | 1/2019 | Lee et al. |
| 10,438,262 B1 | 10/2019 | Helmer et al. |
| 10,467,814 B2 | 11/2019 | Loberg et al. |
| 10,497,175 B2 | 12/2019 | Mount et al. |
| 2005/0035980 A1 | 2/2005 | Lonsing |
| 2007/0024527 A1 | 2/2007 | Heikkinen et al. |
| 2007/0083410 A1 | 4/2007 | Hanna |
| 2008/0074424 A1 | 3/2008 | Carignano |
| 2010/0066750 A1 | 3/2010 | Han et al. |
| 2010/0134688 A1 | 6/2010 | Moriwake |
| 2010/0253700 A1 | 10/2010 | Bergeron |
| 2011/0157179 A1 | 6/2011 | Fahn et al. |
| 2012/0113142 A1 | 5/2012 | Adhikari et al. |
| 2012/0162254 A1 | 6/2012 | Anderson et al. |
| 2012/0162255 A1 | 6/2012 | Ganapathy et al. |
| 2012/0190455 A1 | 7/2012 | Briggs |
| 2012/0195461 A1 | 8/2012 | Lawrence Ashok Inigo |
| 2012/0200667 A1 | 8/2012 | Gay et al. |
| 2012/0327117 A1 | 12/2012 | Weller et al. |
| 2013/0002649 A1 | 1/2013 | Wu et al. |
| 2013/0038601 A1 | 2/2013 | Han et al. |
| 2013/0076790 A1 | 3/2013 | Lefevre et al. |
| 2013/0083008 A1* | 4/2013 | Geisner .............. A63F 13/67 345/419 |
| 2013/0088514 A1 | 4/2013 | Breuss-Schneeweis |
| 2013/0106910 A1 | 5/2013 | Sacco |
| 2013/0141421 A1 | 6/2013 | Mount et al. |
| 2013/0222371 A1 | 8/2013 | Reitan |
| 2013/0249947 A1 | 9/2013 | Reitan |
| 2013/0303285 A1 | 11/2013 | Kochi et al. |
| 2013/0307855 A1 | 11/2013 | Lamb et al. |
| 2013/0321390 A1 | 12/2013 | Latta et al. |
| 2014/0028712 A1 | 1/2014 | Keating et al. |
| 2014/0078174 A1 | 3/2014 | Williams et al. |
| 2014/0108136 A1 | 4/2014 | Zhao et al. |
| 2014/0204119 A1 | 7/2014 | Malamud et al. |
| 2014/0225978 A1 | 8/2014 | Saban et al. |
| 2014/0228118 A1 | 8/2014 | Hardy et al. |
| 2014/0248950 A1 | 9/2014 | Tosas Bautista |
| 2014/0253590 A1 | 9/2014 | Needham et al. |
| 2014/0267404 A1 | 9/2014 | Mitchell et al. |
| 2014/0282220 A1 | 9/2014 | Wantland et al. |
| 2014/0306866 A1 | 10/2014 | Miller et al. |
| 2015/0032766 A1 | 1/2015 | Greenbaum |
| 2015/0062120 A1 | 3/2015 | Reisner-Kollmann et al. |
| 2015/0084951 A1 | 3/2015 | Boivin et al. |
| 2015/0154799 A1 | 6/2015 | Rios et al. |
| 2015/0206349 A1 | 7/2015 | Rosenthal et al. |
| 2015/0235423 A1 | 8/2015 | Tobita |
| 2015/0248785 A1 | 9/2015 | Holmquist |
| 2015/0301592 A1 | 10/2015 | Miller |
| 2015/0316985 A1 | 11/2015 | Levesque et al. |
| 2015/0332512 A1 | 11/2015 | Siddiqui et al. |
| 2015/0348329 A1 | 12/2015 | Carre et al. |
| 2015/0379770 A1 | 12/2015 | Haley, Jr. et al. |
| 2016/0012644 A1 | 1/2016 | Lam |
| 2016/0055677 A1 | 2/2016 | Kuffner |
| 2016/0093106 A1 | 3/2016 | Black |
| 2016/0098863 A1 | 4/2016 | Liu et al. |
| 2016/0104452 A1 | 4/2016 | Guan et al. |
| 2016/0217616 A1 | 7/2016 | Kraver |
| 2016/0217617 A1 | 7/2016 | Barribeau |
| 2016/0232713 A1 | 8/2016 | Lee |
| 2016/0232715 A1 | 8/2016 | Lee |
| 2016/0247320 A1 | 8/2016 | Yuen et al. |
| 2016/0247324 A1 | 8/2016 | Mullins et al. |
| 2016/0253844 A1 | 9/2016 | Petrovskaya et al. |
| 2016/0275722 A1 | 9/2016 | Bretschneider et al. |
| 2016/0307374 A1 | 10/2016 | Kurz et al. |
| 2016/0330161 A1 | 11/2016 | Chakravarthy et al. |
| 2016/0343168 A1 | 11/2016 | Mullins et al. |
| 2017/0053449 A1 | 2/2017 | Lee et al. |
| 2017/0084082 A1 | 3/2017 | McTaggart et al. |
| 2017/0116667 A1 | 4/2017 | High et al. |
| 2017/0131964 A1 | 5/2017 | Baek et al. |

(56) References Cited

U.S. PATENT DOCUMENTS

| | | |
|---|---|---|
| 2017/0132842 A1 | 5/2017 | Morrison |
| 2017/0144068 A1 | 5/2017 | Cohen |
| 2017/0169598 A1 | 6/2017 | York et al. |
| 2017/0169614 A1 | 6/2017 | Tommy et al. |
| 2017/0216728 A1 | 8/2017 | Logan et al. |
| 2017/0221265 A1 | 8/2017 | Lin |
| 2017/0263056 A1 | 9/2017 | Leppanen et al. |
| 2017/0269712 A1 | 9/2017 | Forsblom et al. |
| 2017/0270698 A1 | 9/2017 | Goslin |
| 2017/0287225 A1 | 10/2017 | Powderly et al. |
| 2017/0337744 A1 | 11/2017 | Martin |
| 2017/0337747 A1 | 11/2017 | Hull |
| 2017/0337750 A1 | 11/2017 | McKenzie et al. |
| 2017/0351909 A1 | 12/2017 | Kaehler |
| 2017/0352187 A1 | 12/2017 | Haines |
| 2018/0005435 A1 | 1/2018 | Anderson et al. |
| 2018/0012411 A1 | 1/2018 | Richey et al. |
| 2018/0024363 A1 | 1/2018 | Wong et al. |
| 2018/0040161 A1 | 2/2018 | Tierney et al. |
| 2018/0045963 A1 | 2/2018 | Hoover et al. |
| 2018/0075591 A1 | 3/2018 | Du et al. |
| 2018/0095616 A1 | 4/2018 | Valdivia et al. |
| 2019/0065027 A1 | 2/2019 | Herrington |
| 2019/0342642 A1 | 11/2019 | Adiletta et al. |
| 2019/0371073 A1 | 12/2019 | Harviainen |

OTHER PUBLICATIONS

MacRumors; "Samsung's AR Emoji" vs Apple's Animoji; YouTube Video; Mar. 13, 2018; pp. 1-5; https://www.youtube.com/watch?v=8zoWkmLIzKY (Year: 2018).*

Breen et al., "Interactive Occlusion and Collision of Real and Virtual Objects in Augmented Reality" *European Computer-Industry Research Centre*, 23 pages, 1995.

International Preliminary Report on Patentability Issued in Corresponding PCT Application No. PCT/US2019/032576, mailed Aug. 17, 2020.

International Preliminary Report on Patentability Issued in Corresponding PCT Application No. PCT/US2019/032583, mailed Aug. 17, 2020.

International Search Report and Written Opinion Issued in Corresponding PCT Application No. PCT/US2019/032576, mailed Nov. 12, 2019.

International Search Report and Written Opinion Issued in Corresponding PCT Application No. PCT/US2019/032583, mailed Sep. 17, 2019.

Kawakita and Nakagawa, "Augmented TV: An augmented reality system for TV programs beyond the TV screen," *International Conference on Multimedia Computing and Systems (ICMCS)*, Marrakech, pp. 955-960, 2014.

Zappar; "Augmented Reality for Packaging—Shazam x Bombay Sapphire;" Nov. 2017; YouTube video; pp. 1-5; https://www.youtube.com/watch?v=gcoplvhi_LI.

* cited by examiner

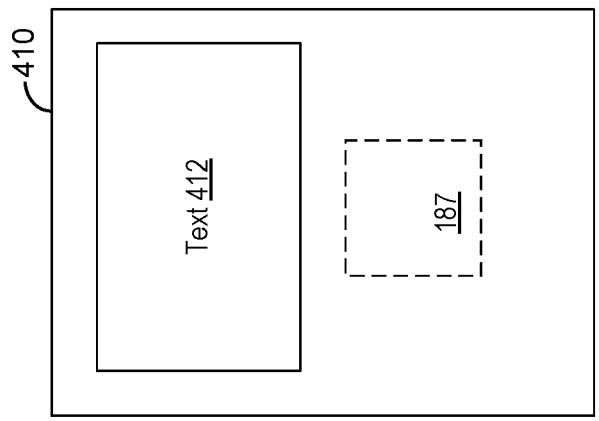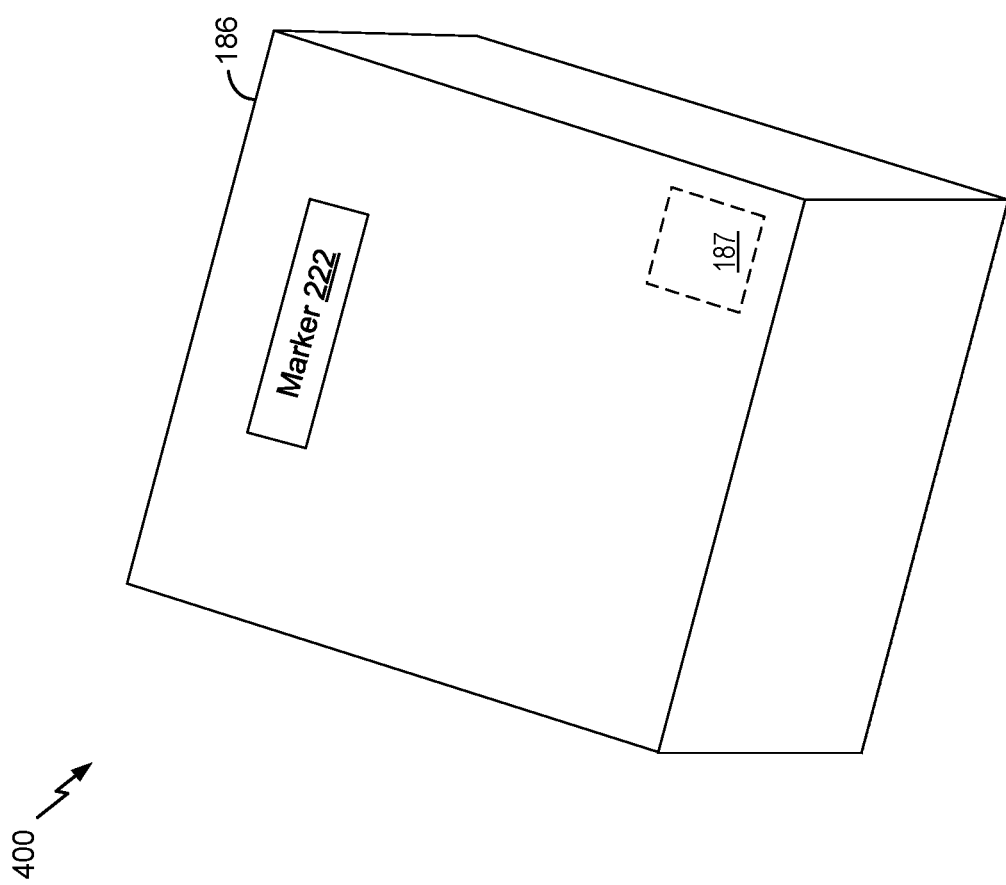
FIG. 4

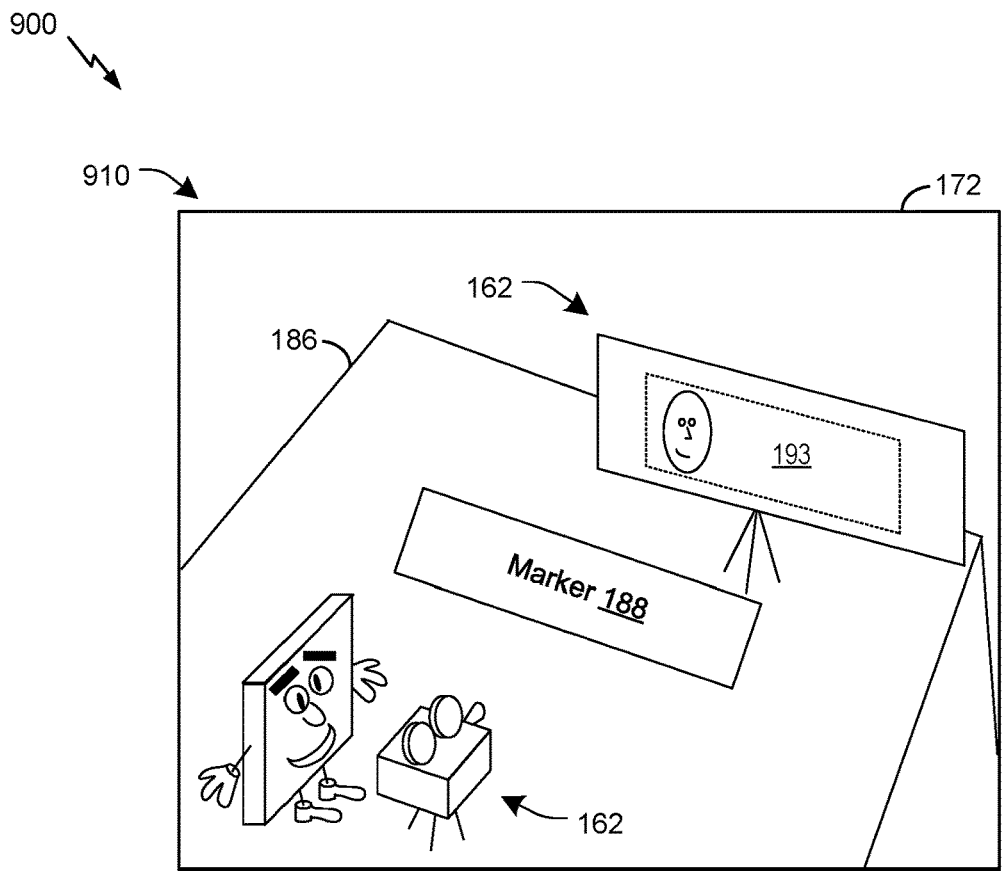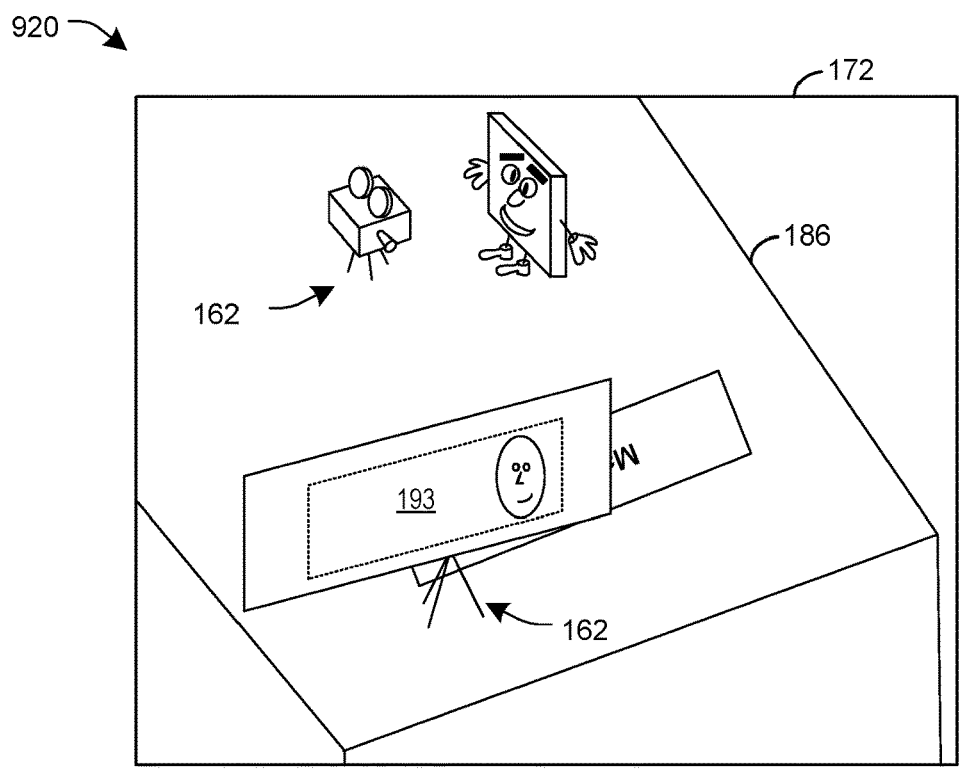
FIG. 9A

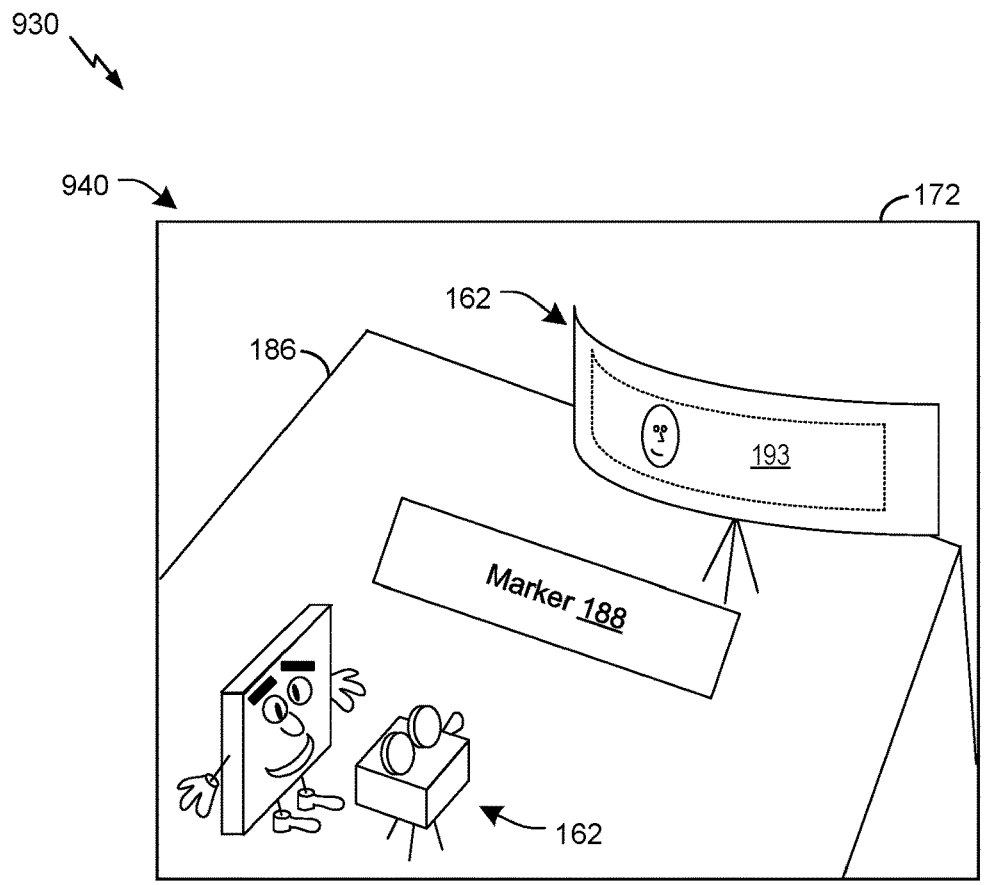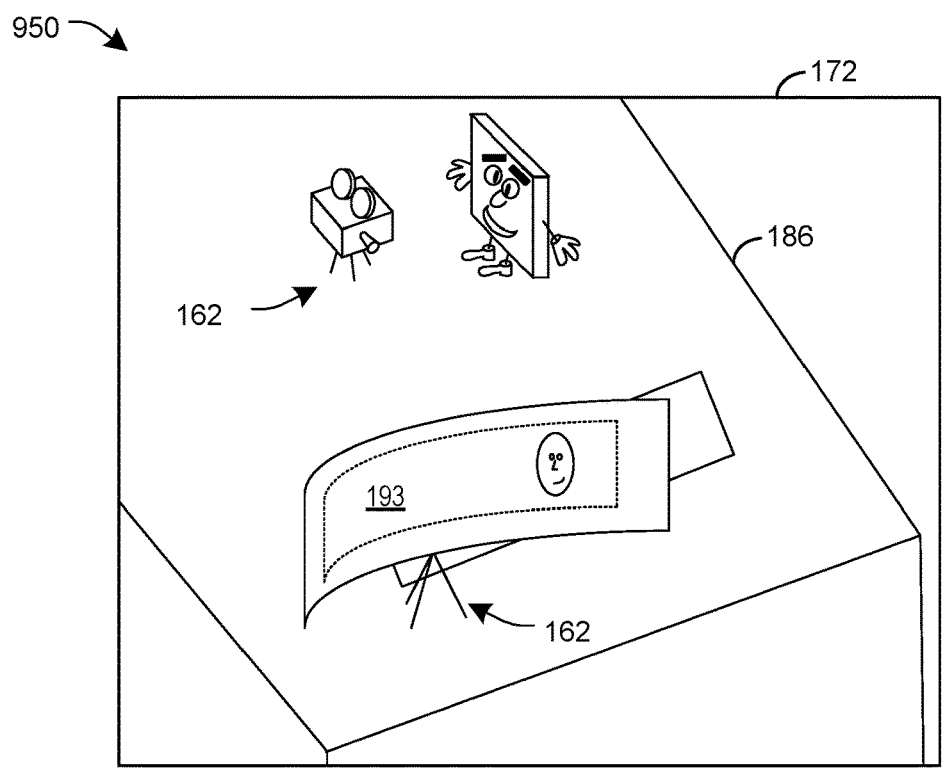
FIG. 9B

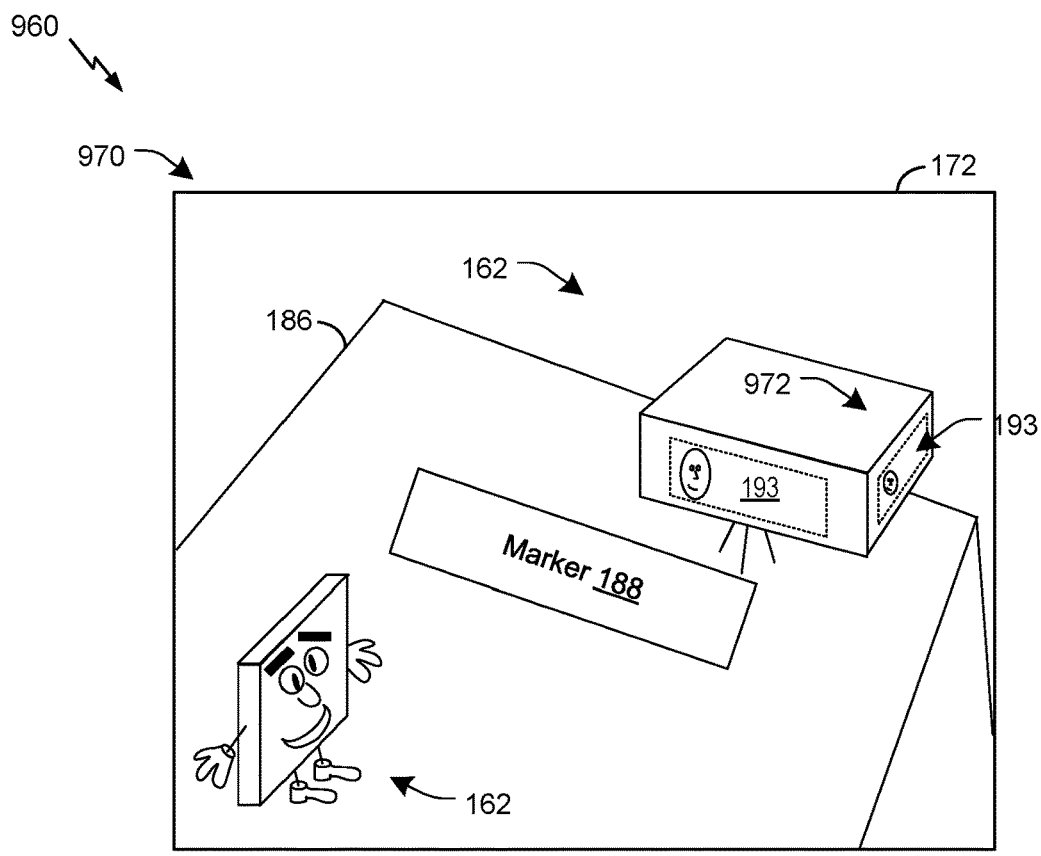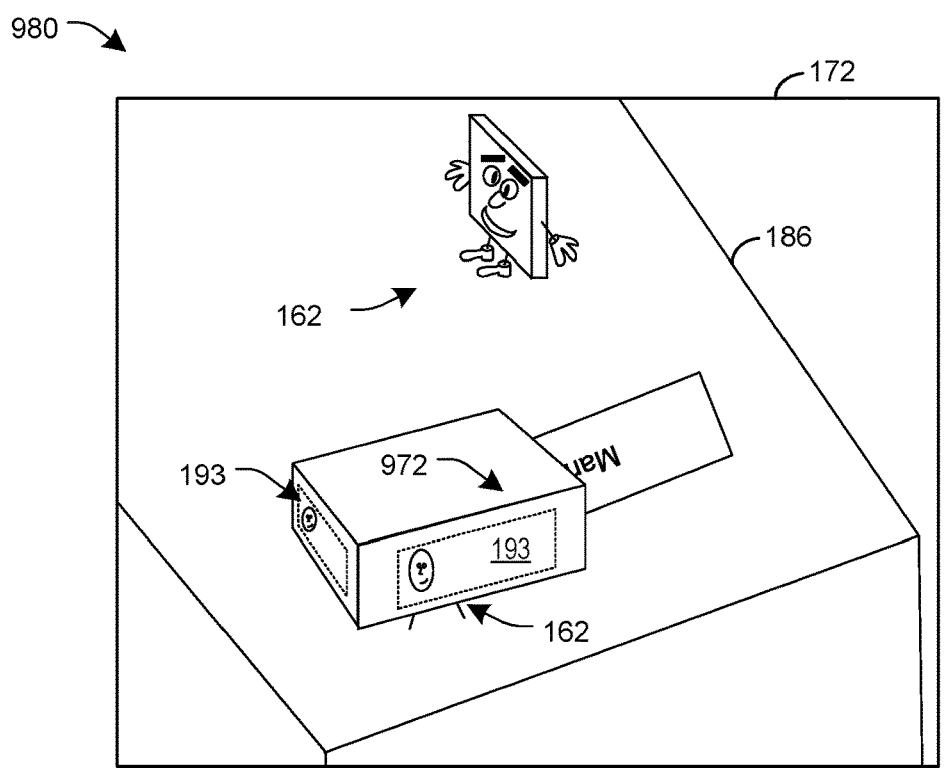
*FIG. 9C*

APPARATUS, METHOD, AND SYSTEM FOR PRESENTATION OF MULTIMEDIA CONTENT INCLUDING AUGMENTED REALITY CONTENT

CROSS-REFERENCE TO RELATED APPLICATIONS

The present application is a continuation of U.S. patent application Ser. No. 17/202,797, filed Mar. 16, 2021, which is a continuation of U.S. patent application Ser. No. 16/403,975, filed on May 6, 2019 and claims benefit of U.S. Provisional Application No. 62/676,748 filed May 25, 2018, all of which are incorporated by reference herein in their entirety.

TECHNICAL FIELD

The present disclosure generally relates to a multimedia content delivery and presentation, and, but not by way of limitation, to methods, devices, and systems for delivering or presenting multimedia content including augmented reality content and video content in a camera video stream.

BACKGROUND OF THE INVENTION

With the proliferation of electronic devices, augmented reality (AR) has been implemented in a variety of contexts. Conventional implementations of augmented reality (AR) include a live direct or indirect view of a physical, real-world environment with elements that are augmented by computer-generated content, such as a graphic (e.g., an animation) and audio.

AR functionality is typically implemented using markless tracking or marker-based tracking. An example of marker-less based tracking is described in U.S. Pat. No. 8,797,353 in which an augmented reality (AR) feature is coupled with a physical object and marker-less tracking is used to present the AR feature on the physical object. For example, a first user captures an image of the physical object, attaches AR content to a location on the physical object represented in the image and sends a rich media message (associated with the AR content attached to the image) to a second user, and transfers the physical object to the second user. In some implementations, the first user may also attach a file, such as a text file (e.g., a text message), music file, or other personal message file. Using an AR viewer and the rich media message, the second user can view the physical object and see the AR feature appearing on the physical object. Such distribution of AR content in this manner is not without several limitations that impact use of the AR feature. To illustrate, the first user is required to capture an image of the first object, the first user has to know or have the ability to send the rich media message to the second user, and the marker-less tracking if often unreliable, thereby disrupting presentation of the AR feature.

In marker-based AR, an application (e.g., an AR viewer) is configured to recognize markers present in a real-world environment. In such implementations, the application must be programmed to recognize the markers, such as geospatial markers, 2D markers, or 3D markers. The AR viewer may detect the marker and launch the AR content based on recognition of the marker. In such systems, a device that includes the AR content is often required to store information for multiple markers and/or a large amounts of data corresponding to AR content for each marker.

Presenting AR content, such as 3D AR content in a live video stream can be challenging because 3D content often requires multiple models or point clouds, complex localization and mapping function, and is very data and computation intensive. AR systems are still in their infancy due the technical complexities of implementing such systems. As AR content continues to grow in popularity and use, many challenging aspect of AR functionality will need to be identified and overcome to produce faster and more efficient AR systems.

SUMMARY

The present disclosure describes devices, systems, methods, and computer-readable storage media for providing augmented reality content in a camera video stream. For example, a mobile device having a camera and a display may display a live video stream captured by the camera and modify the live video stream with augmented reality content and pre-recorded video content that corresponds to an object, such as a packaged delivered to a user.

In some implementations, devices, systems, methods, and computer-readable storage media of the present disclosure enable requester of an order (for delivery of an object to a recipient) to request a multimedia message to be made available. The multimedia message may include augmented reality (AR) content that is provided in a live video stream at a device associated with the recipient. In addition, the requester (other entity) may provide video content to be included in the multimedia message such that the video content is presented along with the AR content—e.g., the video content may be present with and included in 3D AR content. To illustrate, video content may be assigned or attached to an order of an item to be delivered to a recipient. For example, the item may be included in a package having a marker and the package may be delivered to the recipient. Additionally, an identifier that corresponds to the video content and that is associated with the package is provided to the recipient.

In some implementations, the recipient of the package may utilize a mobile device to scan the identifier and send corresponding identifier data to a server associated with the order. Responsive to the identifier data, the mobile device may receive one or more content items, such as the video content, AR content (or an indication of selected AR content), text content, and/or image content. The mobile device (e.g., a processor) may initiate an AR viewer that causes the mobile device to provide at least one live video stream associated with a camera of the mobile device. The mobile device may display a target to direct a user to position the mobile device in a predetermined location with respect to a marker coupled to the package. By providing the target (e.g., a template) for the marker, a user is able to position the mobile device in an initial position, orientation, and distance with respect to the marker. In response to detection of the marker, the mobile device may establish a coordinate system with respect to the marker and initiate a multimedia message in which the AR content (e.g., 3D AR content) and the video content is included in the live video stream from the camera.

In some implementations, the mobile device includes presentation data associated with a location (e.g., 3D position information) of the video content within the 3D AR content. The presentation data may have an initial value that is calibrated to the coordinate system established based on detection of the marker. After detection of the marker, the mobile device may track one or more characteristics of the marker to determine a change in position (e.g., distance, rotation, translation) of the mobile device with respect to changes in features of the marker (e.g., size, angle, horizontal and/or vertical position within the display). The mobile device may modify the position data based on the determined change in position of the marker and/or the mobile device. In some implementations, the mobile device may also generate a set of predicted presentation data values and select one of the predicted set of values for presentation of the video content. The selected value may be determined based on one or more inputs, such as motion data from a sensor (e.g., an inertial sensor) of the mobile device.

Thus, present disclosure describes systems, devices, and methods for providing multimedia content that corresponds to an object, such as a package, delivered to the recipient. In such implementations, a sender/requestor of the order is not required to have access to the package prior to delivery of the package to the recipient. The mobile device associated with the recipient is configured to implement a set rules, such as an AR viewer application, that provided one or more conditions for establishing a coordinate system with respect to the package and/or for dynamically determining video content placement data based on the coordinate system. To illustrate, the video content data may be determined as a function of marker characteristics and a movement prediction algorithm. Based on the video content placement data, the set of rules are further configured to determine and implement video content presentation characteristics (e.g., orientation, translation, size, scale, perspective, etc.) to dynamically adjust the video content for presentation. Accordingly, the video content may be efficiently presented with a live video stream such that the video content interacts with the AR content included in the live video stream. The displayed video content may further be presented based on movement and placement of at least a portion of the AR content such that occlusion and collision algorithm further coordinate and/or synchronize movement of the mobile device with presentation of the AR content and the video content within the live video stream. Thus, the present disclosure advantageously provides multimedia content by establishing a coordinate system in a controlled manner such that the one or more rules may be efficiently applied to dynamically determine adjustments/updates to presentation data associated with the video content and to select the presentation data based at least on features of marker and/or movement or predicted movement of a mobile device.

In an aspect of the present disclosure, one or more methods comprise: receiving, at a processor of a mobile device, a plurality of images from a camera, at least one image of the plurality of images including an object; displaying a camera video stream based on the plurality of images; displaying three dimensional (3D) augmented reality content in the camera video stream; and displaying video content based on the 3D augmented reality content, the video content associated with the object. In some such methods, the object includes a package having one or more items, the package delivered to a user associated with the mobile device, and presentation of the camera video stream including the 3D augmented reality content and the video content is associated with a multimedia message.

In some of the foregoing implementations, the one or more methods may comprise: receiving, at the mobile device, an application; storing the application at a memory of the mobile device; and accessing the application. Additionally, or alternatively, the one or more methods may comprise: receiving, at the processor, a first image from the camera, the first image including an identifier associated with the object; detecting the identifier included in the image; and sending, from the mobile device to a server, at least a portion of the image including the identifier or identifier data based on the identifier.

In some of the foregoing implementations, the one or more methods comprise: receiving, at the mobile device from the server, the video content, where the video content corresponds to the identifier and is associated with a sender of the object, and where the video content comprises audio/visual content. Additionally, or alternatively, the one or more methods may comprise: accessing, by the processor, the camera of the mobile device; and initiating, by the processor, a prompt to capture the image of the identifier, wherein, optionally, the identifier is coupled to the object. In some such implementations, wherein the identifier comprises a marker coupled to the object.

In some of the foregoing implementations, the one or more methods may comprise: receiving, at the processor, a second image from the camera; and detecting, by the processor based on the second image, the object or a marker coupled to the object. Additionally, or alternatively, the one or more methods may comprise: tracking, by the processor, at least a portion of the marker in the plurality of images; determining position information associated with the marker in one or more images of the plurality of images; and displaying the 3D augmented reality content within the camera video stream based on the position information. In some such implementations, the one or more methods may also comprise: receiving, by the processor, placement data associated with the 3D augmented reality content; and determining, by the processor based on the position information and the placement data indicates, a position of the video content in relation to the 3D augmented reality content and/or one or more presentation characteristics of the video content.

In some of the foregoing implementations, the one or more methods may comprise: receiving text data, image data, or both at the mobile device from the server based on the identifier; displaying the text data, the image data, or both in the camera video content; and optionally, arranging the text data, the image data, or both based on the 3D augmented reality content. Additionally, or alternatively, the one or more methods may comprise sending, from the mobile device, a notification associated with a completion of the 3D augmented reality content, the video content, or both. In some such implementations, the one or more methods may also comprise: initiating a prompt to send a message based on a completion of the 3D augmented reality content, the video content, or both; receiving an input to send the message; and sending the message to the server, a device associated with a sender of the object, or both.

In some of the foregoing implementations, the one or more methods comprise: establishing communication with a server; and initiating, via the server, an order for delivery of an item to a recipient. In some such implementations, initiating the order comprises: generating order request information; and communicating the order information to a server. For example, generating the order request information may comprise: selecting the item; and selecting an option to deliver a multimedia message to the recipient. In such implementations, selecting the option to deliver the multimedia message may include: selecting order 3D augmented reality content; providing order video content; providing a text content; and/or providing an image. Additionally, or alternatively, the one or more methods may comprise: receiving confirmation of delivery of the item to the recipient; and/or receiving a notification that the multimedia message has been viewed.

In another aspect of the present disclosure, one or more devices include: a processor; and a memory storing one or more instructions that, when executed by the processor, cause the processor to: receive a plurality of images from a camera, at least one image of the plurality of images including an object; display a camera video stream based on the plurality of images; display three dimensional (3D) augmented reality content in the camera video stream; and display video content based on the 3D augmented reality content, the video content associated with the object. In some such implementations, the one or more devices may further include: a display coupled to the processor; and/or the camera coupled to the processor. Additionally, the one or more instructions may be included in an application that is stored at the memory, and/or the memory may further be configured to store the 3D augmented reality content, the video content, or a combination thereof.

In some of the foregoing implementations, the one or more instruction, when executed by the processor, may further cause the processor to initiate storage at the memory of multimedia content presented via the display, the multimedia content associated with the camera video stream, the 3D augmented reality content, the video content, or a combination thereof. Additionally, or alternatively, in some of the foregoing implementations, the one or more devices may include: a network interface coupled to the processor, where the network interface comprises: a transmitter coupled to the processor, the transmitter configured to transmit one or more wireless signals; and/or a receiver coupled to the processor, the receiver configured to receive one or more wireless signals.

Some implementations of the present computer-readable storage mediums (e.g., computer-readable storage devices) store instructions that, when executed by a processor, cause the one or more processors to perform operations comprising: receiving, at a processor of a mobile device, a plurality of images from a camera, at least one image of the plurality of images including an object; displaying a camera video stream based on the plurality of images; displaying three dimensional (3D) augmented reality content in the camera video stream; and displaying video content based on the 3D augmented reality content, the video content associated with the object.

The foregoing has outlined rather broadly the features and technical advantages of the present disclosure in order that the detailed description that follows may be better understood. Additional features and advantages will be described hereinafter which form the subject of the claims. It should be appreciated by those skilled in the art that the conception and specific examples disclosed may be readily utilized as a basis for modifying or designing other structures for carrying out the same purposes described herein. It should also be realized by those skilled in the art that such equivalent constructions do not depart from the spirit and scope of the disclosure as set forth in the appended claims. The aspects which are characterized herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE FIGURES

For a more complete understanding of the present example inventions, reference is now made to the following descriptions taken in conjunction with the accompanying figures, in which:

FIG. 4 illustrates an example of a package and a card associated with providing multimedia content;

FIGS. 9A, 9B, and 9C illustrate examples of frames of multimedia content associated with delivery of a package;

DETAILED DESCRIPTION OF THE INVENTION

Particular implementations of the present disclosure are described below with reference to the drawings. In the description, common features are designated by common reference numbers throughout the drawings. As used herein, various terminology is for the purpose of describing particular implementations only and is not intended to be limiting of implementations. For example, the singular forms "a," "an," and "the" are intended to include the plural forms as well, unless the context clearly indicates otherwise. It may be further understood that the terms "comprises" and "comprising" may be used interchangeably with "includes" or "including." Additionally, it will be understood that the term "wherein" may be used interchangeably with "where."

As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described. The feature or features of one embodiment may be applied to other embodiments, even though not described or illustrated, unless expressly prohibited by this disclosure or the nature of a described implementation.

Figure 1:
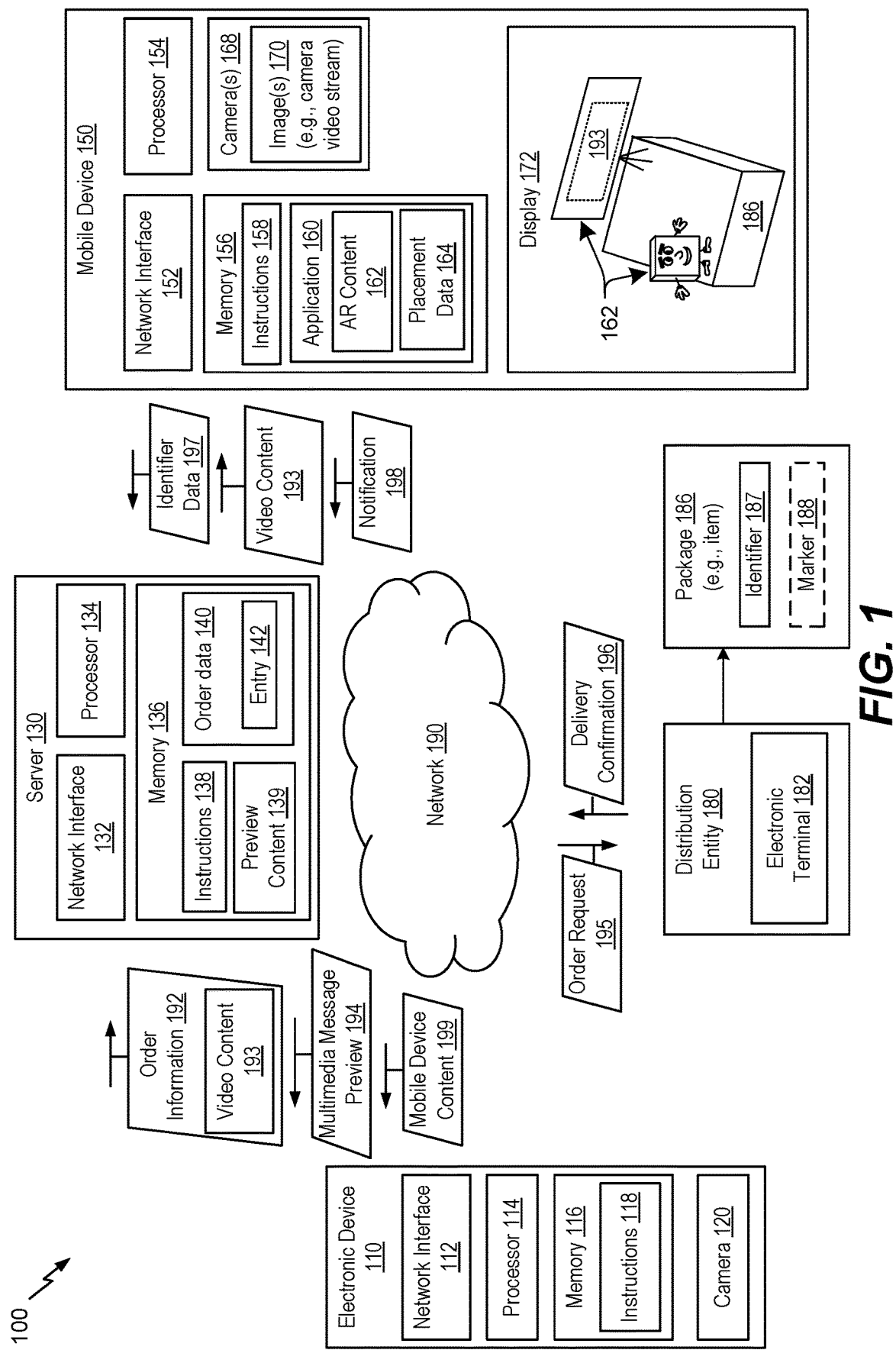
FIG. 1 illustrates an example of a system for providing multimedia content associated with delivery of a package.

Referring to FIG. 1, an example of a system 100 for delivering multimedia content associated with delivery of a package is shown. System 100 includes an electronic device 110, a server 130, a mobile device 150, and a distribution entity 180, each of which may be coupled via a network 190. Network 190 may include a wireless network, a wired network, or a combination thereof. For example, network 190 may include one or more of a local area network (LAN), metropolitan area network (MAN), wide area network (WAN), wireless LAN (WLAN), the Internet, intranet, extranet, cable transmission system, cellular communication network, and/or the like.

Electronic device 110 may include a network interface 112, one or more processors 114, a memory 116, and a camera 120. Network interface 112 may be configured to be communicatively coupled to one or more external devices, such as server 130 and/or mobile device 150, via one or more networks (e.g., 190). For example, network interface 112 may include a transmitter, a receiver, or a combination thereof (e.g., a transceiver). Memory 116 may store instructions 118, that when executed by the one or more processors 114, cause the processor(s) 114 to perform operations as described further here. For example, the one or more processors 114 may perform operations as described with reference to FIG. 12. In some implementations, memory 116 may store an application (e.g., a software program) associated with ordering and/or delivery an item. Camera 120 may include an image capture device configured to generate image data, such as image data and/or video data. In some implementations, electronic device 110 may include one or more input/output (I/O) devices. The one or more I/O devices may include a mouse, a keyboard, a display device, the camera 120, other I/O devices, or a combination thereof.

Electronic device 110 may include or correspond a communications device, a mobile phone, a cellular phone, a satellite phone, a computer, a tablet, a portable computer, a display device, a media player, or a desktop computer. Additionally, or alternatively, the electronic device 110 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle, any other device that includes a processor or that stores or retrieves data or computer instructions, or a combination thereof.

Server 130 may include a network interface 132, one or more processors 134, and a memory 136. Network interface 132 may be configured to be communicatively coupled to one or more external devices, such as electronic device 110, mobile device 150, and/or a device of distribution entity 180, via one or more networks (e.g., 190). For example, network interface 132 may include a transmitter, a receiver, or a combination thereof (e.g., a transceiver). Memory 136 may store instructions 138, preview content 139, order data 140. Instructions 138 may be configured to, when executed by the one or more processors 134, cause the processor(s) 134 to perform operations as described further here. For example, the one or more processors 134 may perform operations as described with reference to FIG. 13. In some implementations, memory 136 may store an application (e.g., a software program) associated with ordering an item for delivery. Preview content 139 may include pre-determined content for generating a preview of multimedia content (e.g., multimedia message preview 194). To illustrate, preview content may include pre-determined video content of a representative package, and augmented reality content and/or video content 193 may be combined with preview content 139 to generate multimedia message preview 194. In some implementations, server 130 may provide multimedia message preview 194 to electronic device 110.

The order data 140 may include a data structure, such as a table, that includes order information (e.g., 192) for one or more orders. For example, each order may be arranged in the order data 140 as an entry 142. To illustrate, entry 142 may include at least a portion of order information 192. An illustrative example of order data 140 (e.g., entry 142) is described further herein with reference to FIG. 3. Additionally, or alternatively, memory 136 may be configured to additional data, such as content associated with a multimedia message as described further herein. For example, such content may include video content 193, AR content, text data, image data, or a combination thereof.

In some implementations, server 130 may comprise a general purpose processor-based system (e.g., PC and/or server system having a processor, memory, suitable I/O functionality, and OS) operating under control of an instruction set to interface with electronic device 110, mobile device 150, and/or distribution entity 180. In some implementations, server 130 may include one or more input/output (I/O) devices. The one or more I/O devices may include a mouse, a keyboard, a display device, the camera 120, other I/O devices, or a combination thereof.

Mobile device 150 may include a network interface 152, one or more processors 154, a memory 156, a camera 168, and a display 172. Network interface 152 may be configured to be communicatively coupled to one or more external devices, such as electronic device 110 and/or server 130, via one or more networks (e.g., 190). For example, network interface 152 may include a transmitter, a receiver, or a combination thereof (e.g., a transceiver). Memory 136 may store instructions 158 and application 160. Instructions 158 may be configured to, when executed by the one or more processors 154, cause the processor(s) 154 to perform operations as described further here. For example, the one or more processors 154 may perform operations as described with reference to FIG. 14.

Application 160 (e.g., a software program) may be associated with ordering and/or delivering an item. In some implementations, application 160 corresponds to an AR viewer and includes one or more sets of rules to perform operations as described herein for presenting multimedia content that includes AR content 162 included in a camera video stream (associated with images 170) and in which video content 193 is dynamically presented based on a position of camera 168 and further based on the AR content within the camera video stream. For example, the one or more sets of rules may direct the recipient to position a camera with respect to package 186 and to establish a coordinate system. Application 160 may include augmented reality (AR) content 162, placement data 163, or both. The placement data 163 may be used for presenting/positioning video content 193 within AR content 162. Additionally, placement data 163 may be used to modify characteristics, such as size and/or scale, of the video content 193. Camera 168 may include an image capture device configured to generate an image 170 (e.g., image data). For example, image 170 may include image data and/or video data. In some implementations, electronic device 110 may include one or more input/output (I/O) devices. The one or more I/O devices may include a mouse, a keyboard, a display device, the camera 120, other I/O devices, or a combination thereof.

Distribution entity 180 is configured to provide a system by which orders may be fulfilled and delivered. In some implementations, distribution entity 180 may include or correspond to a provider, an acquirer of goods and/or services, a distributor, and/or a shipper. For example, distribution entity 180 may be configured to package one or more items to be delivered to a recipient, and to initiate and/or deliver the package. In a particular implementation, server 130 corresponds to a provider (e.g., seller) of one or more items and distribution entity 180 corresponds to a shipping entity that includes and inventory of the one or more items and shipping media (e.g., boxes, envelopes, etc.). In such implementations, distribution entity 180 may deliver a package including one or more items or may operate with a third party for delivery of the package. Although described as being separate from server 130, in other implementations, distribution entity may include server 130.

Distribution entity 180 may include an electronic terminal 182. Electronic terminal may comprise a general purpose processor-based system (e.g., PC and/or server system having a processor, memory, suitable I/O functionality, and OS) operating under control of an instruction set to interface with electronic device 110, server 130, and/or mobile device 150. Electronic terminal 182 may include or correspond a communications device, a mobile phone, a cellular phone, a satellite phone, a computer, a tablet, a portable computer, a display device, a media player, or a desktop computer. Additionally, or alternatively, the electronic terminal 182 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle, any other device that includes During operation of system 100, electronic device 110 may communicate with server 130 to initiate an order for delivery of an item. For example, electronic device 110 may access an order form as described with reference to FIG. 2. In such implementations, electronic device 110 may be associated with or correspond to a sender and/or requestor. In some implementations, the order form may accessible via a web page or an application (e.g., 160), such as an application stored at memory 116. The application (e.g., a software component) may be associated with a provider, distributor, or shipper of the item. Additionally, or alternatively, the application may be associated with a third part that provides a platform or interface for the provider, distributor, or shipper. As an illustrative, non-limiting example, the application may be associated with a business that delivers items, such as flowers, food (e.g., cookies, fruit, etc.), or clothing. In some implementations, the application may include a social medial/social networking feature, such that the sender/requester can communicate with the recipient via the application.

Electronic device 110 may generate order information 192 to initiate the order. For example, electronic device 110 may generate order information 192 to populate the order form. Order information 192 may include an indication of the item to be delivered, sender data (e.g., name, address, phone number, email address, payment information, etc.), recipient information (e.g., name, address, phone number, email address, etc.), a message, or a combination thereof.

Additionally, or alternatively, order information 192 may include or indicate that a multimedia message is to be made available to a recipient of the order. The multimedia message may be associated with multimedia content that includes AR content and/or video content included in a camera video stream. In such implementations, order information 192 may include video content 193. As used herein, video content 193 includes video data (e.g., a plurality of image), or video data and audio data. In some implementations, the sender/requestor may generate video content 193 via electronic device 110 (e.g., 120) as part of filling out the order form. For example, the order form may be configured to prompt the sender/requestor to generate or provide the video content 193. Although described as having the video content generated and/or provided with the order information 192 from the electronic device 110, in other implementations, video content 193 may be generated and or provided by server 130, distribution entity (e.g., electronic terminal 182), or another device or entity. To illustrate, when server 130 and/or distribution entity 180 correspond to a provider, the provider may include the video content 193 into the order information 192 to be used in a multimedia message. For example, if the sender/request does not request a multimedia message (that includes a personalized message for the recipient) with the order, the provider, distributor, and/or shipper may provide the video content 193. Additionally, or alternatively, order information 192 may include a time value, such as a date, a time, a duration, etc., that corresponds to or defines a time period during which the multimedia content is available. To illustrate, the time period may start or be based on an order time when the order is submitted or a delivery time corresponding to delivery of a package (e.g., 186) to a receipting, as illustrative, non-limiting examples. In other implementations, the multimedia content may be available for a predetermined time period (e.g., a pre-set time period).

Server 130 may receive the order information 192 and may generate entry 142 that corresponds to the order information 192. In some implementations, the entry 142 may include an order number and/or identifier (e.g., 187) that is configured to be used as an index to identify entry 142 within the order data 140. Server 130 may also be configured to identify and store video content 193. For example, video content 193 may be stored at memory 136 and included in entry 142, at memory 136 at a location pointed to by entry 142, or at a location remote from server 130 and identified by (e.g., pointed to) entry 142. Although the order data 140 is described as being stored at server 130, in other implementations, order data 140 may be stored at a remote location from server 130, such as at a remote database, at distribution entity 180 (e.g., electronic terminal 182), or at another location.

After receiving order information 192, server 130 may send (e.g., via a push or a pull operation) an order request 195 to distribution entity 180 (e.g., electronic terminal 182). The order request 195 may include at least a portion of the order information 192 and/or at least a portion of entry 142. The distribution entity 180 may process the order request 195 to create a package 186 that includes one or more items. Package 186 may include the item or a shipping media, such as a box, a bag, crate, etc. In some implementations, package 186 may include or correspond to a package identifier (e.g., a package reference) that indicates characteristics of the package, such as dimensions, volume, weight restriction, etc. In such implementations, distribution entity 180 may communicate the package identifier and/or one or more characteristics of package 186 to server 130 and server 130 may optionally include such information in entry 142.

The package 186 may include or be coupled to identifier 187, a representation of identifier 187, and/or a marker 188. To illustrate, identifier 187 may be represented as a bar code, a QC code, alphanumeric text, or a combination thereof, as illustrative, non-limiting examples. In some implementations, the identifier 187 may include or be the same as the marker 188. In other implementations, the marker 188 may include an image, a logo, one or more points or features, etc. The identifier 187 and/or the marker 188 may printed on the package 186 and/or item, printed on a card or sticker that is coupled to the package and/or item, as illustrative, non-limiting examples. In other implementations, the identifier 187 may include a digital or graphical representation that is communicated to a recipient or to a device (e.g., mobile device 150) associated with the recipient.

Distribution entity 180 may initiate physical delivery of package 186 to recipient. For example, the recipient may receive a delivery including package 186 as described with reference to FIG. 4. Based on delivery of package 186 to recipient, distribution entity 180 (e.g., electronic terminal 182) may send a delivery confirmation 196 to server 130, electronic device 110, and/or another device, such as another device associated with the sender. In some implementations, server 130 may receive delivery confirmation 196 and sent a confirmation message (based on delivery confirmation 196) to a device (e.g., 110) associated with sender.

The recipient may be associate with (e.g., be a user of) mobile device 150. Based on receiving package 186, recipient may operate mobile device 150 to access application 160. In some implementations, application 160 includes an AR viewer. If mobile device 150 does not include application 160, mobile device 150 may download application 160, such as from server 130. Processor 154 may execute one or more instructions of application 160 to perform operations described herein. To illustrate, processor 154 may access camera 168 and provide one or more images captured by camera 168 via display 172. For example, the one or more images (e.g., 170), such as a live video stream, may be provided to the display 172 and may be presented in real-time or near real-time. The displayed images presented in real-time or near real-time may be referred to as a camera video stream.

Processor 154 (e.g., application 160) may provide a prompt to capture an image of identifier 187 and/or marker 188 and/or to enter or select an input that corresponds to identifier 187. Processor 154 (e.g., application 160) may detect identifier 187 and determine identifier data 197 based on the detected identifier 187. For example, identifier data 197 may include a portion of image data. As another example, such as when identifier 187 includes a barcode, application may process barcode to determine a data value (e.g., 198). Mobile device 150 may communicate identifier data 197 to server 130. Responsive to receiving identifier data 197 (e.g., identifier 187), server 130 may access entry 142 to identify video content 193 to be provided to mobile device 150 and may communicate the video content to mobile device 150. In some implementations, server 130 may also communicate other information and/or data to mobile device 150 based on the received identifier data 197. For example, server 130 may communicate text data, image data, AR content (or an identifier thereof) to mobile device 150 for use in providing multimedia content.

After transmission of the identifier data 197, processor 154 (e.g., application 160) may generate a prompt via display 172 for recipient to position camera 168 so marker 188 (e.g., package 186) is presented in display 172. For example, processor 154 initiate a target within display as described with reference to FIG. 5. By providing the target (e.g., a template) for the marker 188, a user is able to position the mobile device 150 in an initial position, orientation, and distance with respect to the marker 188. The initial positioning of the mobile device 150 with respect to marker 188 may be known by the mobile device 150. For example, application 160 may include initial positioning data, such as dimension of marker 188, a distance between marker 188 and mobile device 150, an orientation and/or translation of marker 188 with reference to a coordinate system implementation responsive to marker detection, etc.

Processor 154 may detect marker 188 and, in response to detection of the marker 188, may implement a coordinate system with respect to the marker and initiate presentation of multimedia content including the AR content 162 and video content 193 in at least a portion of the video content stream. For example, processor 154 may display AR content 162 and video content 193 within camera video stream. In some implementations, the video content 193 is displayed in relation to and/or on a portion of the AR content. Examples of multimedia content are described herein at least with reference to FIGS. 5-10.

In some implementations, mobile device 150 includes presentation data 164 associated with a location (e.g., 3D position information) of video content 193 within the 3D AR content 162. For example, the presentation data 164 may indicate or define a perimeter or boundary associated with presentation of video content 193. The presentation data 164 may have an initial value that be calibrated to the coordinate system established based on detection of the marker 188. The presentation data 164 may be utilized to display video content 193 for a time period during presentation of the multimedia message. For example, presentation of the video content 193 may be synchronized with the AR content 162.

After detection of the marker 188, mobile device 150 may be configured to track one or more characteristics of the marker 188 to determine a change in position (e.g., distance, rotation, translation) of mobile device 150 with respect to changes in features of the marker 188 (e.g., changes in size, angle, horizontal and/or vertical position within the display). Mobile device 150 may modify/update placement data 163 based on the determined change in position of the marker 188. In some implementations, mobile device 150 may also generate a set of predicted presentation data values and select one of the predicted set of values to be used for presentation of video content 193. The selected value(s) may be determined based on one or more inputs, such as motion data from a sensor (e.g., an inertial sensor) of mobile device 150.

In some implementations, processor 154 may access a second camera of mobile device 150 to record a reaction of the recipient during presentation of the multimedia message. In such implementations, processor 154 may display a camera video stream corresponding to the second camera as described with reference to FIG. 10.

Based on presentation of the multimedia content, mobile device 150 (e.g., processor 154) may send notification 198 that indicates presentation of the multimedia content. For example, mobile device 150 may send notification 198 to server 130 in response to initiation of the multimedia content, during the multimedia content, or in response to an end of the multimedia content. Based on notification 198, server 130 may notify the sender/requester (via electronic device 110) that the multimedia content has been provided to recipient.

In some implementations, after presentation of the multimedia content, processor 154 may provide a prompt, via display, to send one or more recordings, such as a recording of the multimedia content presented via display 172, send a second recording (e.g., recipient's reaction) associated with a second camera, and/or to record and send a reply message to sender. For example, processor 154 may provide a prompt as described with reference to FIG. 10. In response to a request to send the one or more recordings, processor 154 may send mobile device content 199 to server 130. Server 130 may store the one or more recordings which may be accessible to electronic device 110 via an application stored at memory 116. Electronic device 110 may play the one or more recordings. An example of the one or more recordings played via electronic device 110 is described with reference to FIG. 11.

One advantage provided by the system 100 is 3 that multimedia content (e.g., AR content 162 and/or video content 193) that corresponds to an object, such as package 186, may be made accessible to and/or delivered to the recipient. Mobile device 150 associated with the recipient is configured to implement a set rules (e.g., 160), such as an AR viewer application, that provided one or more conditions for establishing a coordinate system with respect to the package 186 and/or for dynamically determining video content placement data (e.g., 193) based on the coordinate system. To illustrate, the video content data for display may be determined as a function of marker characteristics and a movement prediction algorithm. Based on the video content placement data (e.g., 163), the set of rules are further configured to determine and implement video content presentation characteristics (e.g., orientation, translation, size, scale, perspective, etc.) to dynamically adjust the video content 193 for presentation. Accordingly, the video content 193 may be efficiently presented with a live video stream (e.g., 170) such that the video content 193 interacts with the AR content 162 included in the live video stream. The displayed video content may further be presented based on movement and placement of at least a portion of the AR content 162 such that occlusion and collision algorithm further coordinate and/or synchronize movement of the mobile device 150 with presentation of the AR content 162 and the video content 193 within the live video stream (e.g., 170). Thus, the present disclosure advantageously provides multimedia content by establishing a coordinate system in a controlled manner such that the one or more rules may be efficiently applied to dynamically determine adjustments/updates to presentation data associated with the video content 193 and to select the placement data 163 based at least on features of marker 188 and/or movement or predicted movement of mobile device 150.

Figure 2:
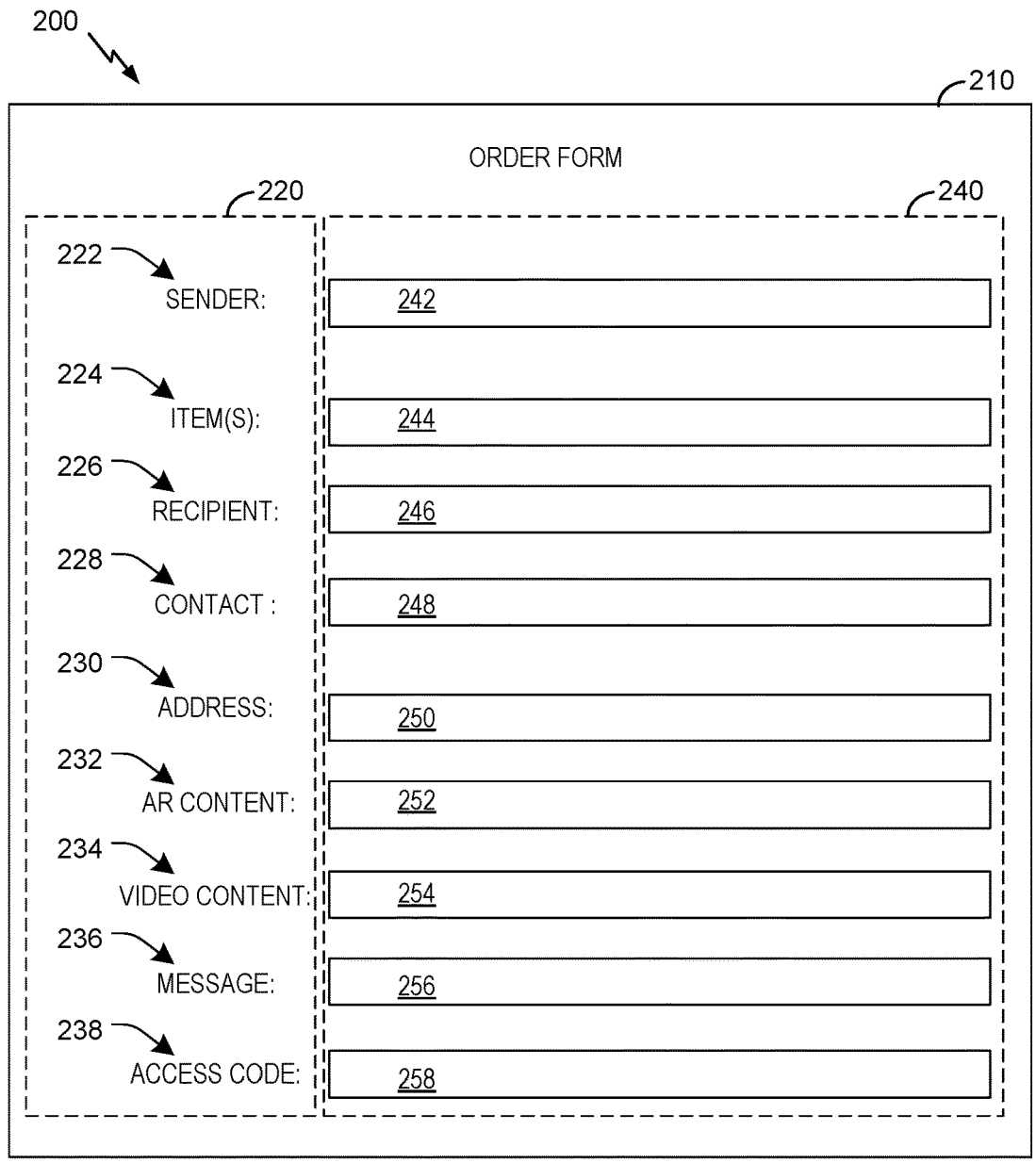
FIG. 2 illustrates an example of an order form associated with providing multimedia content associated with delivery of a package.

Referring to FIG. 2, an example of an order form 210 is shown. Order form 210 includes one or more categories 220, such categories 222-238, and one or more corresponding fields 240, such as fields 242-258. Fields 240 may be populated via user input and may be configured to receive text data, an indication of a file location, an input via a selectable option of the field, etc.

The one or more categories 220 may include a sender 222, an item(s) 224, a recipient 226, a contact 228, an address 230, AR content 232, video content 254, message 236, and an access code 238. Sender field 242 may be populated with a name, user name, account number, address, contact information, etc. associated with an individual or entity. For example, the individual or entity may be associated with populating and/or submitting order form 210. Item(s) field 244 may be populated with one or more items to be delivered to a recipient, such as a user of mobile device 150. As illustrative, non-limiting examples, the one or more items may include a consumable good (e.g., cookies, fruit, a sandwich, alcohol, etc.), clothing (e.g., shoes, a shirt, a hat, etc.), a promotional item (e.g., a poster, a book, a pamphlet, etc.), and/or another item. Recipient field 246 may be populated with a name, user name, account number, etc., associated with an individual or entity to receive the one or more items identified in item(s) field 244. Contact field 248 may be populated with a phone number, email address, etc. associated with the recipient. Address field 250 may be populated with a physical address, location description, directions, passcode, etc. associated with delivering the one or more items to the recipient.

AR content field 252 may be populated to indicate AR content is to be provided in a multimedia message that is made available to and/or presented to at least the recipient. In some implementations, AR content field 252 may include one or more selectable options of AR content (e.g., 162). To illustrate, a first option may correspond to a first animated character, a second option may correspond to a second animated character, and a third option may correspond to a holiday theme, as illustrative, non-limiting examples. Video content field 254 may be populated to include or identify video content (e.g., 193) to be included in the multimedia message. To illustrate, video content field 254 may provide one or more options for the sender to record or attach video content (e.g., a video message). Message field 256 may be populated with text data, an image, or a combination thereof. Access code field 258 may be populated with security data, such as a passcode (e.g., password), security phase and/or security answer, etc. The access code field 258 may be populated with the security data to limit or restrict access to the multimedia content. To illustrate, the security data may be known by the recipient, or may be provided to the recipient, and may be required to be provided in order for the recipient to receive a portion or an entirety of the multimedia message, such as the video content (e.g., 193) and/or the message (associated with message field 256). For example, if the security data is not known by the recipient, the security data may be provided to the recipient, such as via text message, phone message, email, etc. In some implementations, the security data may be provided to the recipient based on delivery of the one or more items (e.g., package 186). Referring to FIG. 1, server 130 may be configured to communicate security data to mobile device 150 in response to receiving delivery confirmation 196. Additionally, or alternatively, access code field 258 may provide options to limit or restrict a number of times the multimedia message can be viewed, whether the multimedia message is recordable, how long the multimedia message is available/accessible, etc.

Although order form 210 has been described as including particular fields (e.g., 242-258), such fields and descriptions are for illustration purposes and are not intended to be limiting. For example, order form 210 may include more fields or fewer fields than described. To illustrate, in some implementations, order form 210 further includes a delivery time field associated with a requested time of delivery (e.g., date, time, etc.) of the one or more items to the recipient. Additionally, or alternatively, one or more of fields 242-258 may include multiple subfields.

Thus, FIG. 2 illustrates an example of an order form 210 to enable able a sender to initiate a multimedia message to be made available to a receiver of one or more items (e.g., package 186). For example, order form 210 is configured to enable a sender (e.g., a requester) to provide video content (e.g., 193) to be incorporated into the multimedia message and displayed in relation to and/or with AR content. Additionally, order form 210 beneficially enables a security feature to be provided with the multimedia message to restrict or limit access to and/or dissemination of the multimedia message.

Figure 3:
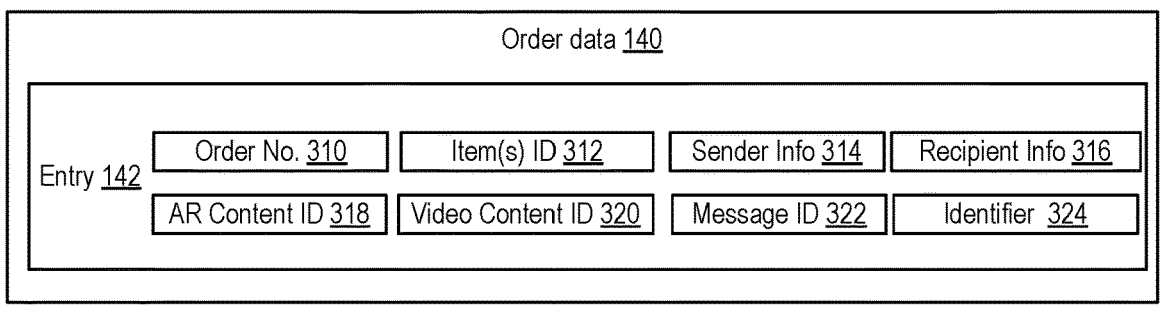
FIG. 3 illustrates an example of a data structure associated with providing multimedia content associated with delivery of a package.

Referring to FIG. 3, an example of order data 140 is shown. Order data 140 may be generated by, stored at, and/or maintained by one or more servers, such as server 130. Order data 140 includes one or more entries, such as entry 142. Entry 142 includes an one or more fields. The one or more fields my include an order number 310, an item(s) ID 312, sender information 314, recipient information 316, an AR content ID 318, a video content ID 320, a message ID 322, and an identifier field 324 (corresponding to identifier 187). Item(s) ID 312 may include or correspond to the one or more items identified and/or described with reference to item(s) field 244. Sender information 314 may include or correspond to information included in sender field 242. Recipient information 316 may include or correspond to information included in recipient field 246, contact field 248, and/or address field 250.

AR content ID 318 may include AR content (e.g., 162), an AR content identifier (of a plurality of AR content identifiers) and/or an indication of a storage location of AR content. For example, a first AR content identifier may correspond to a first animated character, a second AR content option may correspond to a second animated character, a third AR content identifier may correspond to a birthday theme, and a fourth AR content identifier may correspond to a get well theme, as illustrative, non-limiting examples. Video content ID 320 may include video data (e.g., video content 193) or an indication of a storage location of the video data. For example, the video data may include or correspond to data included in video content field 254. Message ID 322 may include message data or an indication of a storage location of the message data. For example, the message data may include or correspond to data included in message field 256.

Although entry 142 is described as including each of the fields 310-324, in other implementations, entry 142 may include fewer fields or more fields. To illustrate, in a particular implementation, entry 142 may not include AR content ID 318 and/or may include an access code field associated with access code field 258. Additionally, or alternatively, one or more of fields 310-324 may include multiple subfields.

Thus, FIG. 3 illustrates an example of order data 140 that is associated with delivery of a package (e.g., 186) and a corresponding multimedia message. For example, order data 140 may enable a server to provide order request 195 to distribution entity 180 and to provide AR content 162 and/or video content 193 to mobile device 150. Additionally, in some implementations, order data 140 (e.g., entry 142) enables server 130 to provide information, such as delivery confirmation 196 and/or mobile device content 199 to electronic device 110 associated with the sender.

Referring to FIG. 4, an example of a delivery 400 is shown. Delivery 400 includes package 186 and, optionally, a card 410 (e.g., an insert). Package 186, card 410, or both may include identifier 187, such as a barcode, a QR code, text, or a combination thereof, as illustrative, non-limiting examples. As shown, card 410 includes a text portion 412. Text portion 412 may include instructions directing the recipient of package 186 on how to receive (e.g., access) the multimedia content. For example, text portion 412 may direct the recipient to download and/or access application 160. Using application 160, recipient may scan (using camera 168) identifier 187. Additionally, or alternatively, text portion 412 may provide instructions for the recipient to access preview content (e.g., multimedia message preview 194) via server 130. For example, in situations where the recipient does not have access to a mobile device and/or does not have the ability to access application 160 or a camera (e.g., 168), the text portion 412 may provide instructions for the recipient to access, such as via a website, multimedia message preview 194. Thus, FIG. 4 provides an illustrative example of delivery 400 that includes marker 188 and/or identifier 187 to a recipient to enable presentation of multimedia content as described herein.

Referring to FIGS. 5-10, examples of displayed frames of multimedia content associated with delivery of a package (e.g., 168) are shown. For example, one or more of the frames may include or correspond to at least a portion of a camera video stream (e.g., 170) into which AR content (e.g., 162) and video content (e.g., 193) is added. To illustrate, the camera video stream may include or correspond to one or more images 170, and the one or more frames may be displayed via a display, such as display 172, of a device. The device may include electronic device 110 or mobile device 150, as illustrative, non-limiting examples. To illustrate, one or more frames of FIGS. 5-10 may be generated by an application, such as application 160.

As described with reference to FIGS. 5-10, an application (e.g., 160) may be configured to access and/or operate one or more cameras, process one or more images, and/or perform one or more image processing operations, such as object detection, object recognition, object tracking (using a marker or marker-less), or a combination thereof, as illustrative, non-limiting examples. Additionally, as described herein, the camera video stream may be presented in real-time or near real-time such that a user viewing display 172 does not perceive a noticeable delay between a change in position and/or orientation of a camera and presentation of the camera video stream (produced based on a field of view of the camera). In some implementations, a delay in presentation of the camera video stream may be noticeable and may still be considered near real-time. To illustrate, such delays may be based on a processing capability and/or image rendering capability of a device (e.g., 110, 150) that includes the camera. It is noted that one or more frames of and/or one or more operations described with reference to one of the methods of FIGS. 5-10 may be combined with one or more frames of and/or one or more operations of another of FIGS. 5-10. For example, one or more frames of FIG. 4 may be combined with one or more frame of FIG. 6. As another example, one or more frames of FIGS. 5-6 may be combined with the frame of FIG. 8. As another example, one or more frames of FIGS. 9A-9C may be combined with the frame of FIG. 7. As another example, one or more frames of FIG. 5-6 or 9A-9C may be combined with one or more frames of FIG. 10.

Figure 5:
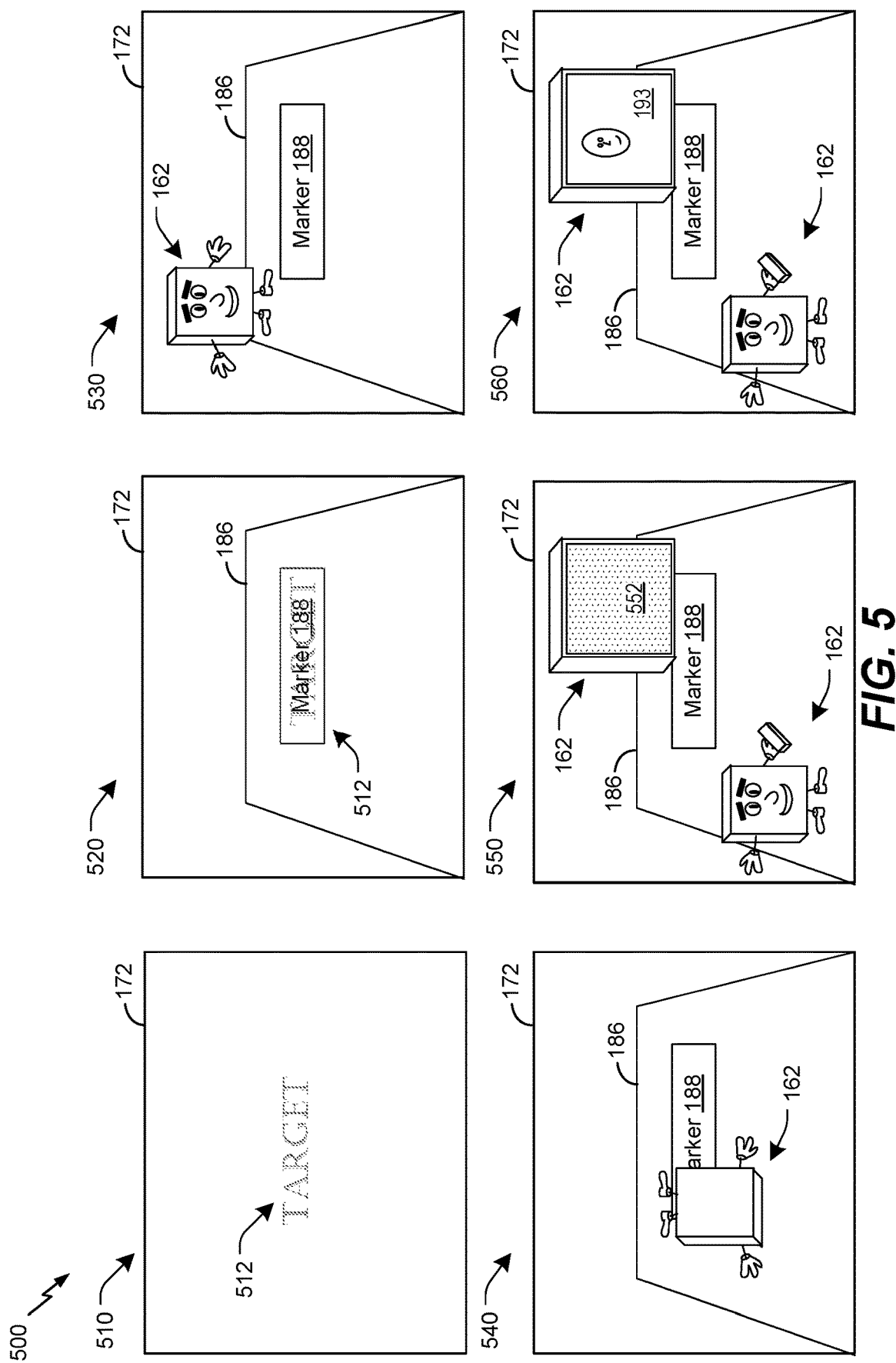
FIG. 5 illustrates an example of displayed frames of multimedia content associated with delivery of a package.

Referring to FIG. 5, an example of a series of frames 500 presented via display 172 is shown. A first frame 510 of the series 500 displays a target 512. In some implementations, target 512 may be presented based on accessing application 160, detecting identifier 187, communicating identifier data 197 to server 130, receiving video content 193, or a combination thereof. Target 512 may be configured to aid a user in aligning a marker (e.g., 188) within a field of view of a camera. In some implementations, target 512 may include a bracket, line, and/or border to frame (e.g., outline) the marker, a transparent representation of the marker, or a combination thereof, as illustrative, non-limiting examples.

A second frame 520 of series 500 includes target 512 positioned over marker 188 of package 186. For example, package 186 may be included in a camera video stream (e.g., 170) presented via display 172. Application 160 may perform objection recognition/detection on second frame 520 to identify marker 188. Based on detecting marker 188, the application may determine a position of marker 188, establish a coordinate system based on marker 188, identify one or more edges of box (e.g., 186), perform object tracking on marker 188 and/or package 186, or a combination thereof. Additionally, or alternatively, in response to detection of marker 188, application 160 may remove target 512 from display 172 and/or may initiate presentation of the multimedia message including AR content 162 and video content 193.

A third frame 530 of series 500 includes AR content 162, such as a 3D animated character, within third frame 530. The character is displayed at a first position within the camera video stream (e.g., 170) that includes package 186. To illustrate, between second frame 520 and third frame 530, the animated character may move to the first position on package 186. As illustrative, non-limiting examples, the animated character may have appeared out of thin air, dropped down onto package 186, parachuted onto package 186, or climbed onto package 186. A fourth frame 540 of series 500 shows the character (e.g., 162) at a second position within the camera video stream. For example, between third frame 530 and fourth frame 540, the character may have walked from the first position towards the second position and tripped over marker 188. In other implementations, the character may tripped over another objected included in the camera video stream, such as a ribbon (not shown) that is coupled to or incorporated into package 186.

A fifth frame 550 of series 500 includes the animated character at a third position within the camera video stream and additional AR content 162, such as a monitor (e.g., a television), at a fourth position within the camera video stream. In fifth frame 550, animated character includes a remote control in one hand. To illustrate, between fourth frame 540 and fifth frame 550, the animated character may have produced the remote control and operated the remote control to cause the monitor to be included (e.g., drop down onto or raise up from package 186) in the camera video stream. The monitor may have a screen 552 that is associated with or corresponds to video content 193 to be displayed. In some implementations, a boundary/perimeter of screen 552 may include or correspond to the placement data 163.

A sixth frame 560 of series 500 includes the AR content 162 (e.g., animated character and monitor) included within the camera video stream. Sixth frame 560 also includes video content 193 within camera video stream and positioned based on AR content 162. For example, video content 193 is positioned within the monitor such that video content 193 is presented via screen 552 of the monitor. To further illustrate, between fifth frame 550 and sixth frame 560, the animated character may have operated the remote control to cause video content 193 to be presented via screen 552 of the monitor.

Thus, FIG. 5 illustrates aspects of initiation and presentation of the multimedia message via display 172. The multimedia message may present the AR content 162 in the camera video stream. Additionally, the multimedia message may present the video content 193 in relation to the AR content.

Figure 6:
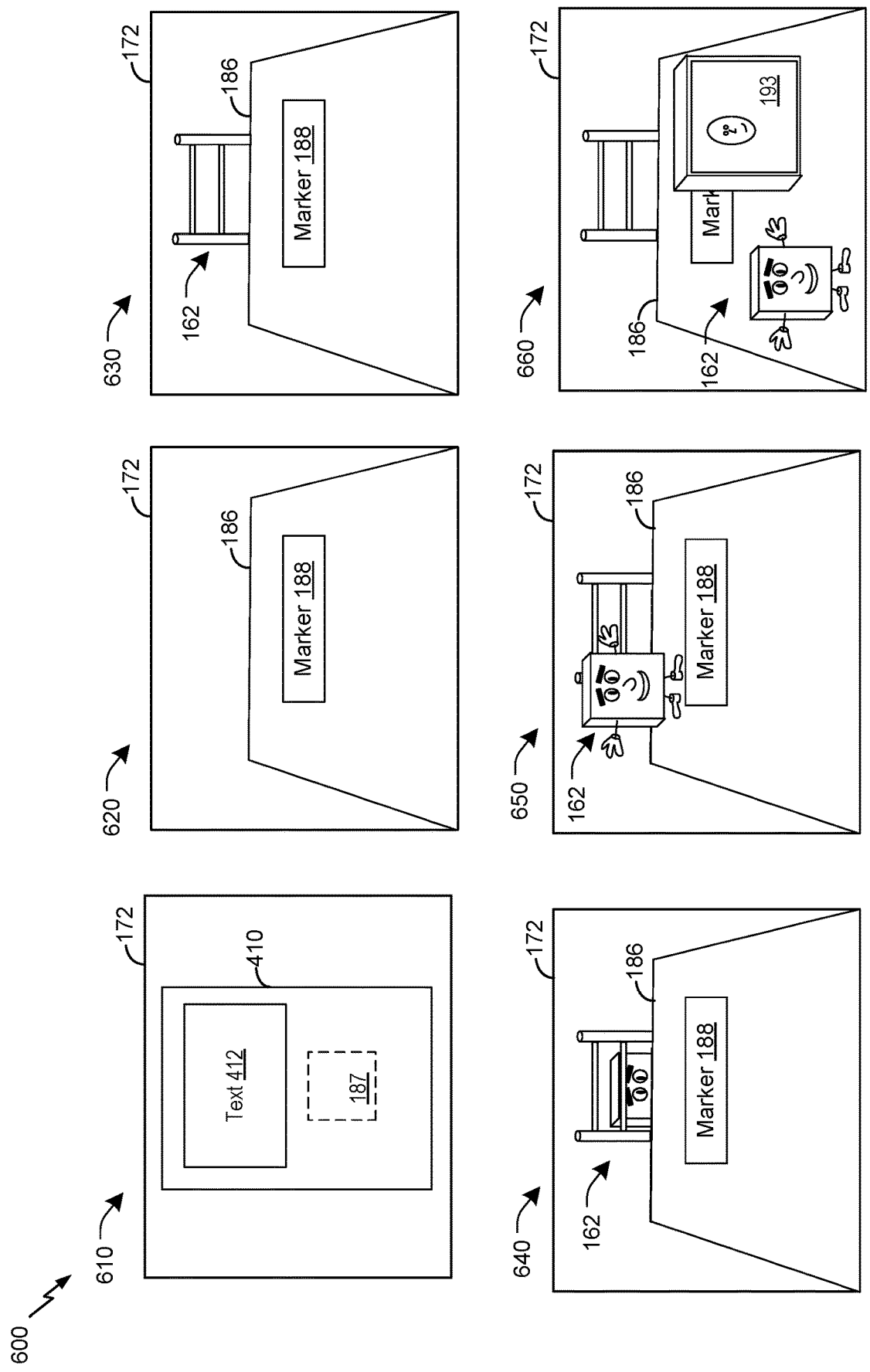
FIG. 6 illustrates another example of displayed frames of multimedia content associated with delivery of a package.

Referring to FIG. 6, an example of a series of frames 600 presented via display 172 is shown. A first frame 610 of the series 600 is associated with a camera video stream (e.g., 170) and includes card 410 having identifier 187. Based on first frame 610, application 160 may detect identifier 187 and send identifier data 197 to server 130. In other implementations, identifier 187 may be coupled to package 186 and first frame 610 may include identifier 187 coupled to package 186. Responsive to sending identifier data 197 to server 130, mobile device 150 may receive AR content 162, video content 193, and/or other content (e.g., text data and/or image data) from server 130.

A second frame 620 of the series 600 includes package 186 including marker 188. Prior to second frame 620, application 160 may have detected and identified marker 188. For example, first frame 510 and second frame 520 of series 500 of FIG. 5 may have occurred between first frame 610 and second frame 610 of series 600.

A third frame 630 of series 600 includes AR content 162, such as a ladder, within third frame 630. To illustrate, between second frame 620 and third frame 630, the ladder may have propped against a side of package 186. A fourth frame 640 of series 600 shows AR content 162 including the ladder and the animated character. To illustrate, between third frame 630 and fourth frame 640, the animated character may have climbed up a portion of the ladder towards a top surface of package 186. A fifth frame 650 of series 600 includes the animated character at a first position on the top surface of package 186. To illustrate, between fourth frame 640 and fifth frame 650, the animated character may have climb off of the ladder onto the top surface of package 186 and moved to the first position. A sixth frame 660 of series 600 includes the AR content 162, such as the ladder, the animated character, and the monitor. Sixth frame 660 also includes video content 193 positioned based on AR content 162. For example, video content 193 is positioned within the monitor such that video content 193 is presented via a screen of the monitor. To further illustrate, between fifth frame 650 and sixth frame 660, the monitor may have been included in the camera video stream and animated character may have moved to a second position as shown in sixth frame 660.

Thus, FIG. 6 illustrates aspects of initiation and presentation of the multimedia message via display 172. For example, FIG. 6 illustrates detection of identifier 187 and presentation of AR content 162 in the camera video stream. Additionally, FIG. 6 illustrates presentation of the video content 193 based on (e.g., within) the AR content 162.

Figure 7:
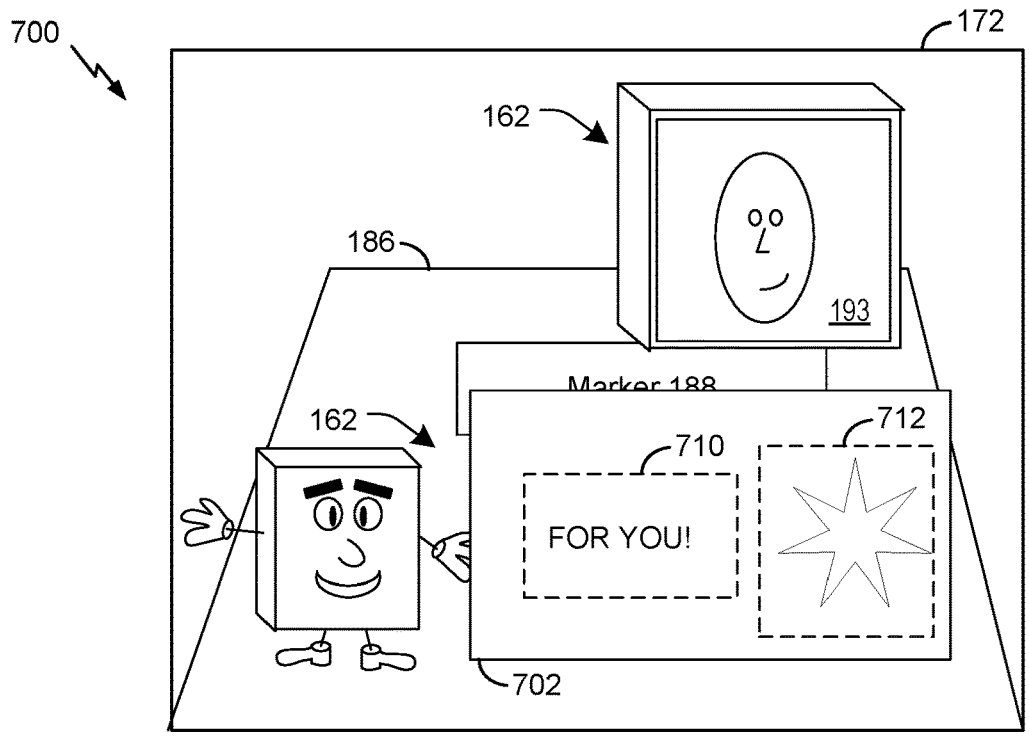
FIG. 7 illustrates an example of a frame of multimedia content associated with delivery of a package.

Referring to FIG. 7, an example of a frame 700 included in a series of frames (associated with a multimedia message) presented via display 172 is shown. As shown, frame 700 includes package 186 AR content 162, such as an animated character and a monitor (e.g., a television). Video content 193 is positioned within the monitor such that video content 193 is presented via a screen of the monitor. The AR content 162 also includes a sign 702 (e.g., a card). Sign 702 includes one or more portions, such as a first portion 710 including text content and a second portion 712 including an image, such as a logo, picture, graphic, etc. The content included in first portion 710, second portion 712, or both, may include or correspond to message field 256 and or message ID 322. Sign 702 may be included in the camera video content prior to, during (e.g., a portion or an entirety), and/or after presentation of video content 193. Thus, FIG. 6 illustrates aspects of presentation of the multimedia message via display 172.

Figure 8:
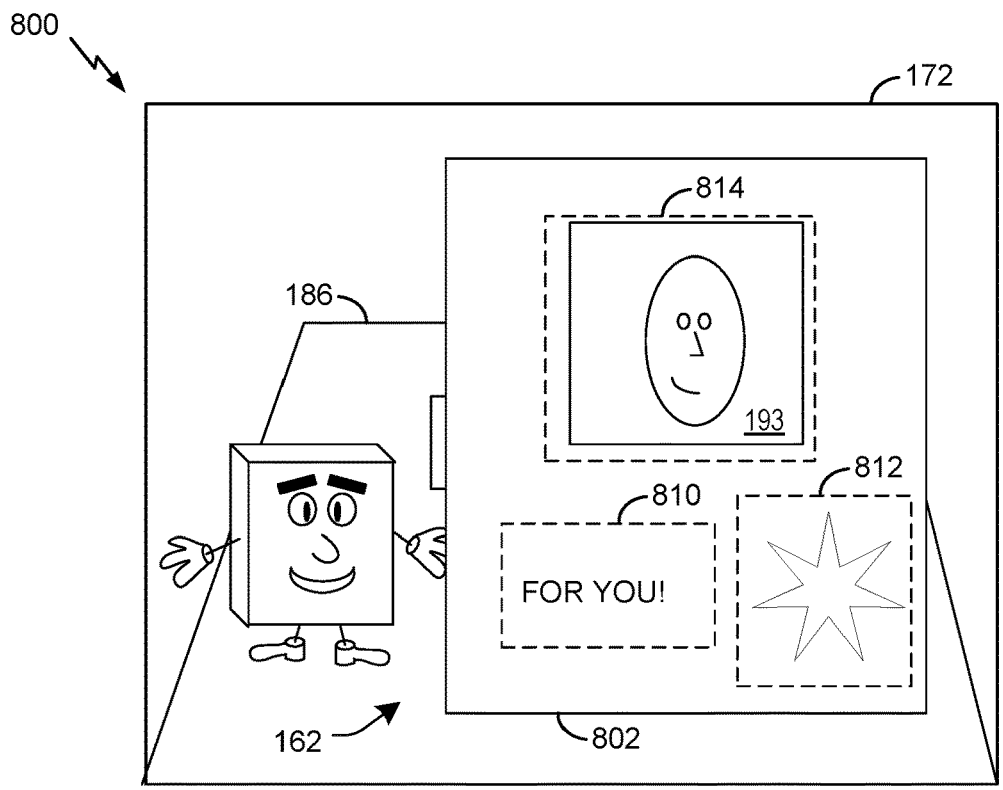
FIG. 8 illustrates another example of a frame of multimedia content associated with delivery of a package.

Referring to FIG. 8, an example of a frame 800 included in a series of frames (associated with a multimedia message) presented via display 172 is shown. As shown, frame 800 includes package 186 and AR content 162, such as an animated character and a sign 802 (e.g., a card). Sign 802 includes one or more portions, such as a first portion 810, a second portion 812, and a third portion 814. First portion 810 includes text content, second portion 812 includes an image, such as a logo, picture, graphic, etc., and third portion 814 includes video content 193. The content included in first portion 810, second portion 812, or both, may include or correspond to message field 256 and or message ID 322. Thus, FIG. 7 illustrates aspects of presentation of the multimedia message via display 172.

Referring to FIGS. 9A-9C, examples of AR content 162 in which video content 193 is presented are shown. To illustrate, each of the examples of FIGS. 9A-9C enable at least a portion video content 193 to be viewed over a range of camera positions and/or camera orientations. For example, each of FIGS. 9A-9C include a first frame associated with a first camera pose (e.g., a first position and a first orientation of camera 168 with respect to package 186 (e.g., marker) and a second frame associated with a second camera pose (e.g., a second position and a second orientation of camera 168 with respect to package 186 (e.g., marker 188). In some implementations, the first camera pose is associate with a front view of package 186 and the second camera pose is associated with a rear view of package 186. In each of the first frame and the second frame, a portion and/or version of video content 193 is visible to a user such that movement/positioning of the camera by the user is not limited in order to view the video content 193 of the multimedia message.

Referring to FIG. 9A, an example of a series of frames 900 (associated with camera video stream 170) presented via display 172 is shown. A first frame 910 of the series 900 includes a frame of camera video stream (e.g., 170) captured by camera (e.g., 168) at a first position and first orientation with respect to package 186 (e.g., marker 188). For example, first frame 910 may correspond to a first camera pose associated with camera 168. First frame 910 includes AR content 162, such as the animated character, a projector, and a projection screen. As shown, a front view of video content 193 is presented on the projection screen that is flat. The video content may be positioned and/or sized in relation to the AR content 162 (e.g., the projection screen) based on the first camera pose, such as the first position and orientation of camera 168.

A second frame 920 of the series 900 includes another frame of camera video stream captured by camera 168 at a second position and a second orientation with respect to package 186 (e.g., marker 188). For example, second frame 920 may correspond to a second camera pose associated with camera 168. Second frame 920 includes AR content 162, such as the animated character, the projector, and the projection screen. As shown, video content 193 is presented on the projection screen. As compared to first frame 910, video content 193 displayed in second frame 920 is a reverse image (e.g., a rear view) of video content 193 displayed in first frame 910.

Referring to FIG. 9B, an example of a series of frames 900 (associated with camera video stream 170) presented via display 172 is shown. A first frame 940 of the series 930 is associated with the first camera pose and a second frame 950 of the series 930 is associated with the second camera pose. Each of the first and second frames 940, 950 includes AR content 162, such as the animated character, the projector, and the projection screen. As shown, the projection screen has a curved surface. In other implementations, the projection screen may have different size, shape, and/or geometry. For example, the projection screen may be disc shaped (e.g., semi-spherical).

Referring to FIG. 9C, an example of a series of frames 960 (associated with camera video stream 170) presented via display 172 is shown. A first frame 970 of the series 960 is associated with the first camera pose and a second frame 980 of the series 960 is associated with the second camera pose. Each of the first and second frames 970, 980 includes AR content 162, such as the animated character and a three-dimensional (3D) structure of multiple screens. For example, as shown in first frame 970, the multi-screen structure includes a front screen and a side screen. In some implementations, a top surface 972 of the multi-screen structure may include text content or an image (e.g., a logo). As shown in second frame 980, the multi-screen structure includes the side screen and a rear screen. Each of the screens of the multi-screen structure may include video content 193. To illustrate, video content 193 presented via each screen of the multi-screen structure may be synchronized in time.

Figure 10:
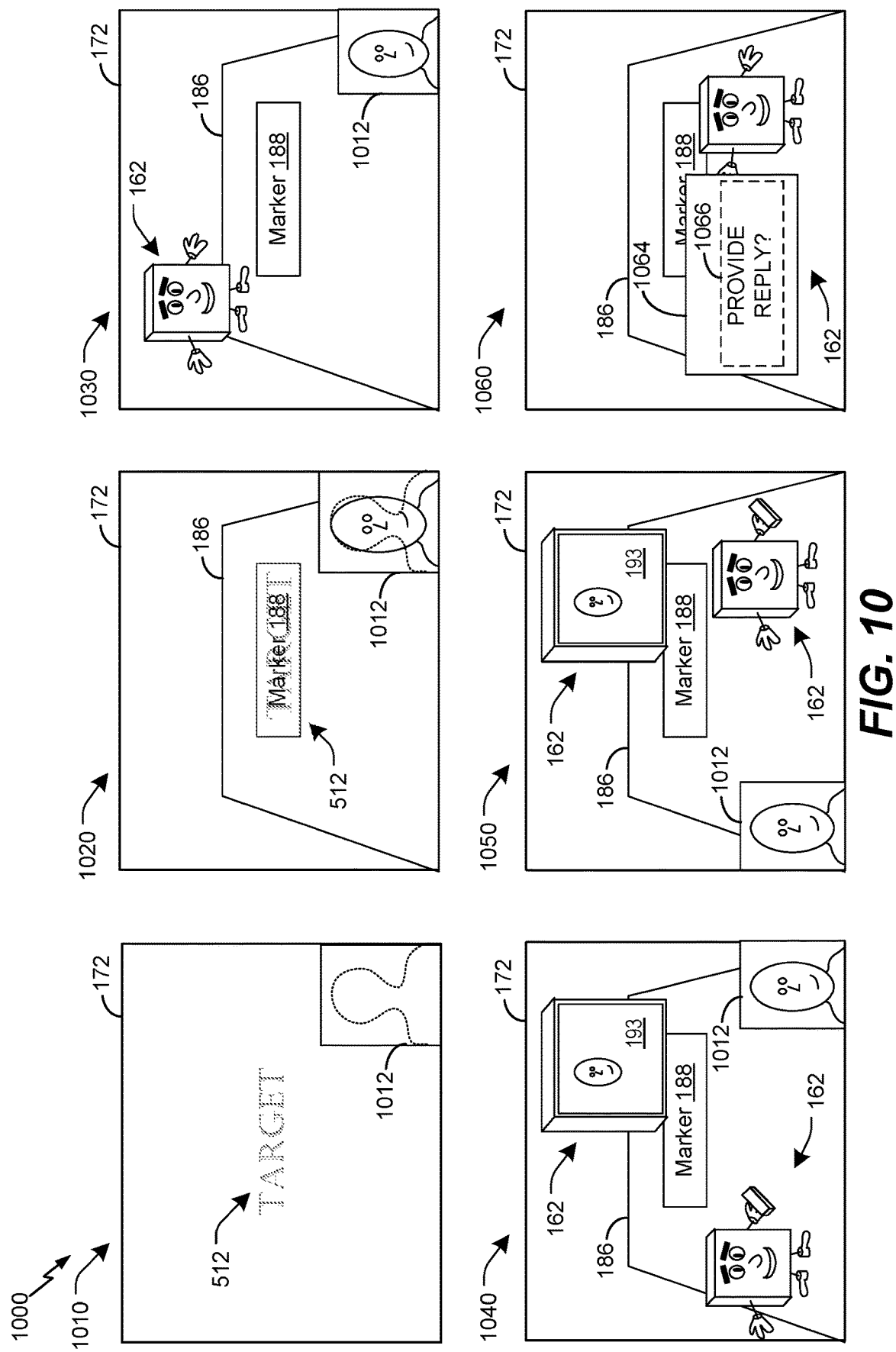
FIG. 10 illustrates another example of displayed frames of multimedia content associated with delivery of a package.

Referring to FIG. 10, an example of a series of frames 1000 presented via display 172 is shown. A first frame 1010 of the series 1000 displays target 512 in a camera video stream corresponding to a first camera (e.g., 168). Target 512 may be configured to enable a user to align a marker (e.g., 188) within a field of view of the first camera. First frame 1010 also includes a user portion 1012 associated with a second camera video stream of a second camera. To illustrate, mobile device 150 may include multiple camera, such as a front facing camera (e.g., first camera) and a rear facing camera (e.g., second camera). As shown, user portion 1012 includes a target (e.g., dashed line).

A second frame 1020 of series 1000 includes target 512 positioned over marker 188 of package 186. For example, package 186 may be included in a camera video stream (e.g., 170) presented via display 172. An application (e.g., 160) may perform objection recognition/detection on second frame 520 to identify marker 188. Based on detecting marker 188, the application may determine a position of marker 188, establish a coordinate system based on marker 188, identify one or more edges of box (e.g., 186), perform object tracking on marker 188 and/or package 186, or a combination thereof. Additionally, as shown, a face of the user is included user portion 1012. In some implementations, application 160 may detect that an object (e.g., a face) is present in second camera video stream. Based on identification of marker 188 and/or detection of both marker 188 and the object (e.g., a face), application 160 may initiate presentation of AR content (e.g., 162) and/or video content (e.g., 193) within first camera video stream (e.g., 170). In some implementations, based on identification of marker 188 and/or detection of both marker 188 and the object (e.g., a face), application 160 may initiate a first recording corresponding to presentation of AR content (e.g., 162) and/or video content (e.g., 193) within first camera video stream (e.g., 170). Additionally, or alternatively, based on identification of marker 188 and/or detection of both marker 188 and the object (e.g., a face), application 160 may initiate a second recording corresponding to second camera video stream.

A third frame 1030 of series 1000 includes AR content 162, such as a 3D animated character at a first position, within third frame 1030. To illustrate, between second frame 520 and third frame 530, target 512 and the target of user portion 1012 have been removed, and the animated character may be presented on package 186. As compared to second frame 1020, user portion 1012 has a reduced size to make more of the first camera video stream (and AR content) visible via display 172.

A fourth frame 1040 of series 1000 shows AR content 162 that includes animated character (at a second position) and a monitor (e.g., a television) within the first camera video stream. In fourth frame 1040, animated character includes a remote control in one hand and video content 193 is presented and positioned based on AR content 162. For example, video content 193 is positioned within the monitor such that video content 193 is presented via a screen of the monitor.

A fifth frame 1050 of series 1000 shows the animated character at a third position. To illustrate, between fourth frame 1040 and fifth frame 1050, the animated character moved from the second position (e.g., a lower left portion of display 172) to the third position (e.g., a lower right portion of display 172). Based on the movement of the animated character between fourth frame 1040 and fifth frame 1050, application 160 may have adjusted a characteristic of user portion 1012. For example, the characteristic of user portion 1012 may include a size, a shape, a position, a location, a transparency, another characteristic, or a combination thereof. As shown in fifth frame 1050, user portion 1012 is positioned in the lower right of display 172 as compared to being displayed in the lower right of display 172 in fourth frame 1040. In some implementations, application 160 may adjust the characteristic of user portion 1012 in response to a determination that at least a portion of or an entirety of the character is within a threshold a threshold distance of user portion 1012.

A sixth frame 1060 of series 1000 includes the AR content 162 (e.g., animated character and a sign 1064). Sixth frame 1060 may be presented after completion of the video content 193. In some implementations, sixth frame 1060 may be presented after application 160 stopped storing the first recording and/or the second recording. The sign 1064 may include a portion 1066 that includes a message for the user. For example, the message may indicate an option for the user to provide a reply message to a sender of package 186. To illustrate, the reply message may include the first recording, the second recording, a text message (e.g., a static message or a dynamic/scrolling message), a video message recorded by the user (e.g., a pre-recorded or existing video), or a video recorded after presentation of the multimedia content including the AR content 162 and the video content 193), an audio clip, or a combination thereof. In a particular implementation, application 160 may control the second camera and display 172 to enable the user to record a reply video message for the sender.

Thus, FIG. 10 illustrates aspects of presentation of the multimedia message via display 172. For example, as described with reference to FIG. 10, first and/or second recordings may be generated in association presentation of the multimedia content. The first and/or second recordings may be available to the user (e.g., recipient) for replay or transmission/posting for another user (i.e., sender). In some implementations, an option to record an additional message and/or video content may be presented to the user (e.g., recipient).

Figure 11:
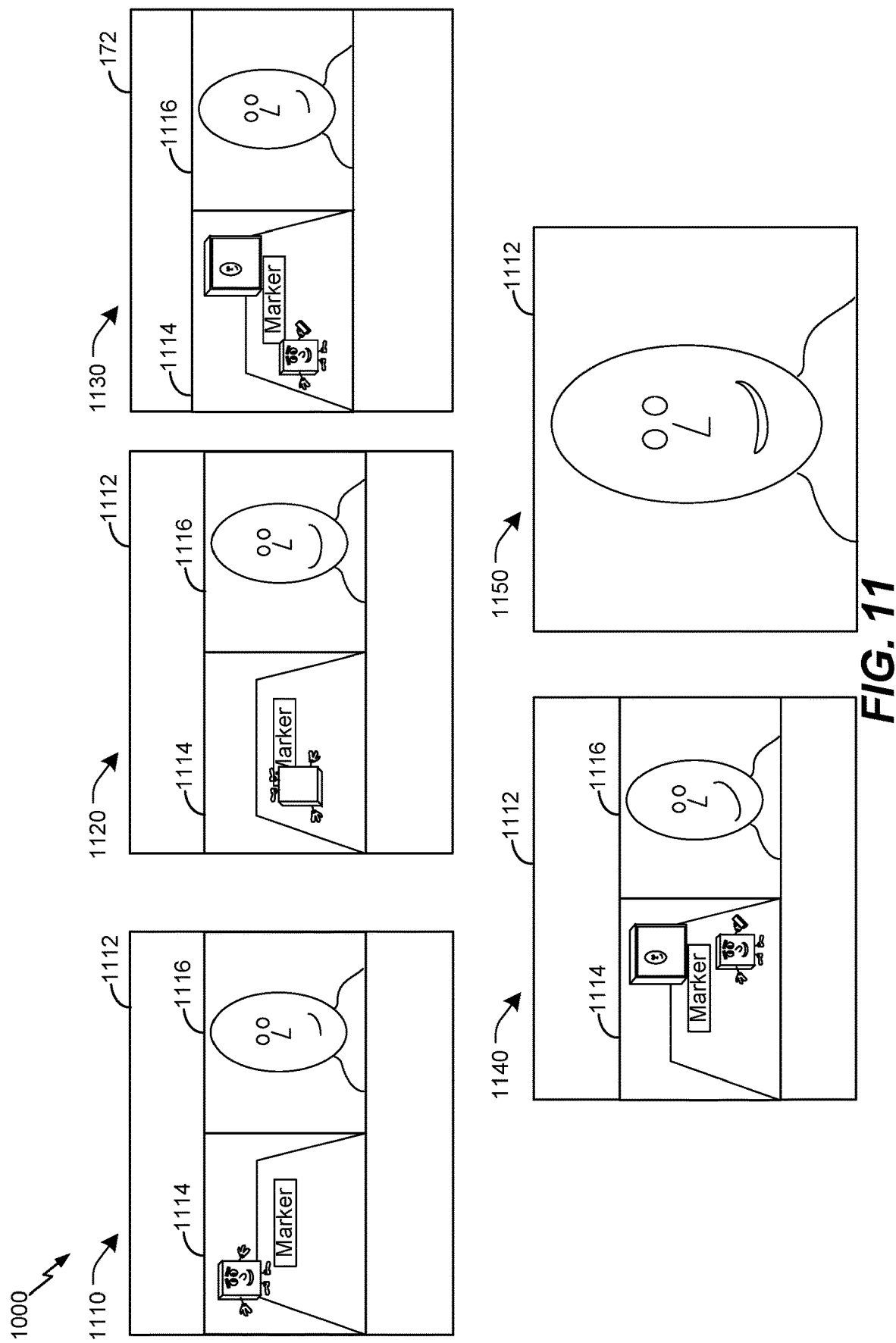
FIG. 11 illustrates an example of content from a mobile device displayed at an electronic device.

Referring to FIG. 11, an example of a series of frames 1100 presented via a display 1112 is shown. Display 1112 may include or correspond to a display of a device, such as electronic device 110 or mobile device 150. The series of frames 1100 may include or correspond to playback of recorded content, such as content recorded at the same device or a different device. For example, the recorded content ma include or correspond to mobile device content 199.

A first frame 1110 of the series 1100 includes a first portion 1114 and a second portion 1116. First portion 1114 may include or correspond to a first recording, such as a recording of multimedia content presented at mobile device 150. Second portion 1116 may include or correspond to a second recording, such as recording of a user of mobile device 150 during presentation of the multimedia content at mobile device 150. For example, the second recording may include or correspond to content displayed via user portion 1012. As shown, first frame 1110 shows first scenes of each of the first recording (presented in first portion) and second recording (presented in second portion). In some implementations, presentation of the first and second recordings via display 1112 may be time synchronized.

A second frame 1120 of series 1100 shows second scenes of each of the first recording (presented in first portion) and second recording (presented in second portion). For example, as shown, second frame 1120 shows the animated character (in first portion 1114) after the animated character tripped, and shows a reaction of the user (in second portion 1116) responsive to observing that the animated character tripping. A third frame 1130 of series 1100 shows third scenes of each of the first recording (presented in first portion) and second recording (presented in second portion). For example, as shown, third frame 1130 shows the animated character and the monitor including video content (in first portion 1114), and shows the user (in second portion 1116). A fourth frame 1140 of series 1100 shows fourth scenes of each of the first recording (presented in first portion) and second recording (presented in second portion). In some implementations, the fourth scenes may be associated with an end of the first and second recordings.

A fifth frame 1150 of series 1100 shows a recorded video message from the user (e.g., the receiver) to the sender. For example, the message may have been recorded after the user viewed the multimedia content. Although FIG. 11 has been described as presenting three different recordings, in other implementations, fewer than three or more than three recordings may be presented.

Thus, FIG. 11 illustrates describes playback of recorded content associated with the multimedia message. To illustrate, a first recording presented via first portion 1114 includes the multimedia message as presented to the recipient and second recording presented via second portion 1116 include the recipient's demeanor/reaction during presentation of the multimedia message. The third recoding presented after the first and second recordings includes a message from the recipient to the sender.

Figure 12:
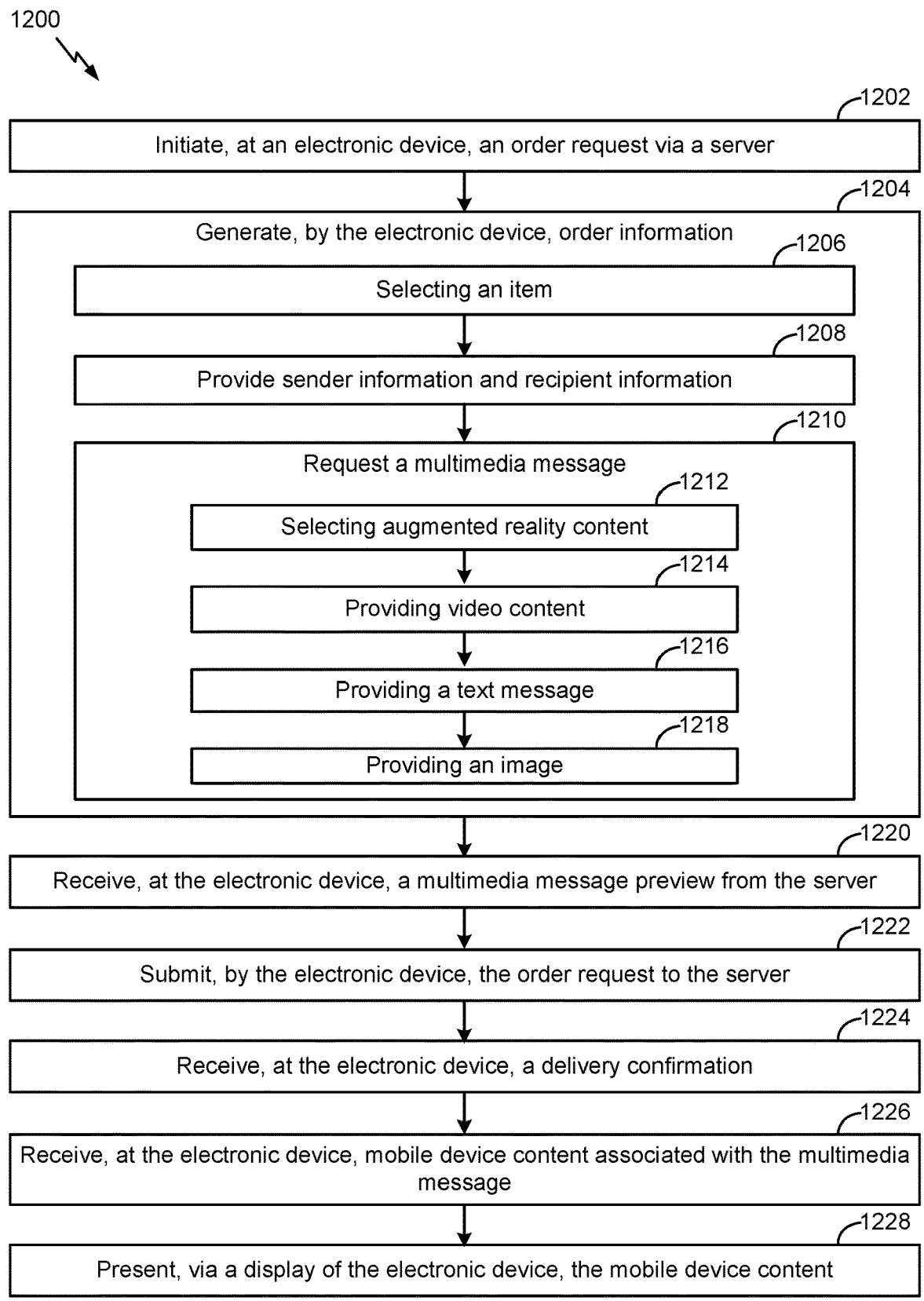
FIG. 12 illustrates a flow diagram of an example of a method of operating an electronic device.

Referring to FIG. 12, a method 1200 of operating an electronic device is shown. For example, method 1200 may be performed by electronic device 110, mobile device 150, or electronic terminal 182.

Method 1200 may include initiating, at the electronic device, an order request via a server, at 1502. For example, the order request may include or correspond to order form 210. The server may include or correspond to server 130.

Method 1200 includes generating order information by the electronic device, at 1204. For example, the order information may include or correspond to order information 192, input(s) provided to one or more fields 242-258, or a combination thereof. To illustrate, generating (e.g., 1204) the order information may include selecting an item, at 1206, providing sender information and recipient information, at 1208, and requesting a multimedia message, at 1210. Requesting (e.g., 1210) the multimedia content may include selecting augmented reality content, at 1212, providing video content, at 1214, providing a text message, at 1216, providing an image, at 1218, or a combination thereof. For example, the augmented reality content and the video content may include or correspond to AR content 162 and video content 193, respectively.

Method 1200 may include receiving, at the electronic device, a multimedia message preview from the server, at 1220. The multimedia message preview may include or correspond to preview content 139. Method 1200 includes submitting, by the electronic device, the order request to the server, at 1222. The order request may include or correspond to order information 192 and/or order form 210.

Method 1200 may include receiving, at the electronic device, a delivery confirmation, at 1224. The delivery confirmation, such as delivery confirmation 196, may correspond to delivery of a package that includes at least one item identified in the order request. For example, the package may include or correspond to package 186 delivered by distribution entity 180.

Method 1200 may include receiving, at the electronic device, mobile device content associated with the multimedia message, at 1226. For example, the mobile device content may include or correspond to mobile device content 199 and/or series of frames 1100. Method 1200 may include presenting the mobile device content via a display device of the electronic device, at 1228. Thus, method 1200 may enable operation of an electronic device (e.g., 110, 150) to order delivery of an item to a recipient and to be notified of delivery of multimedia content associated with the delivery.

Figure 13:
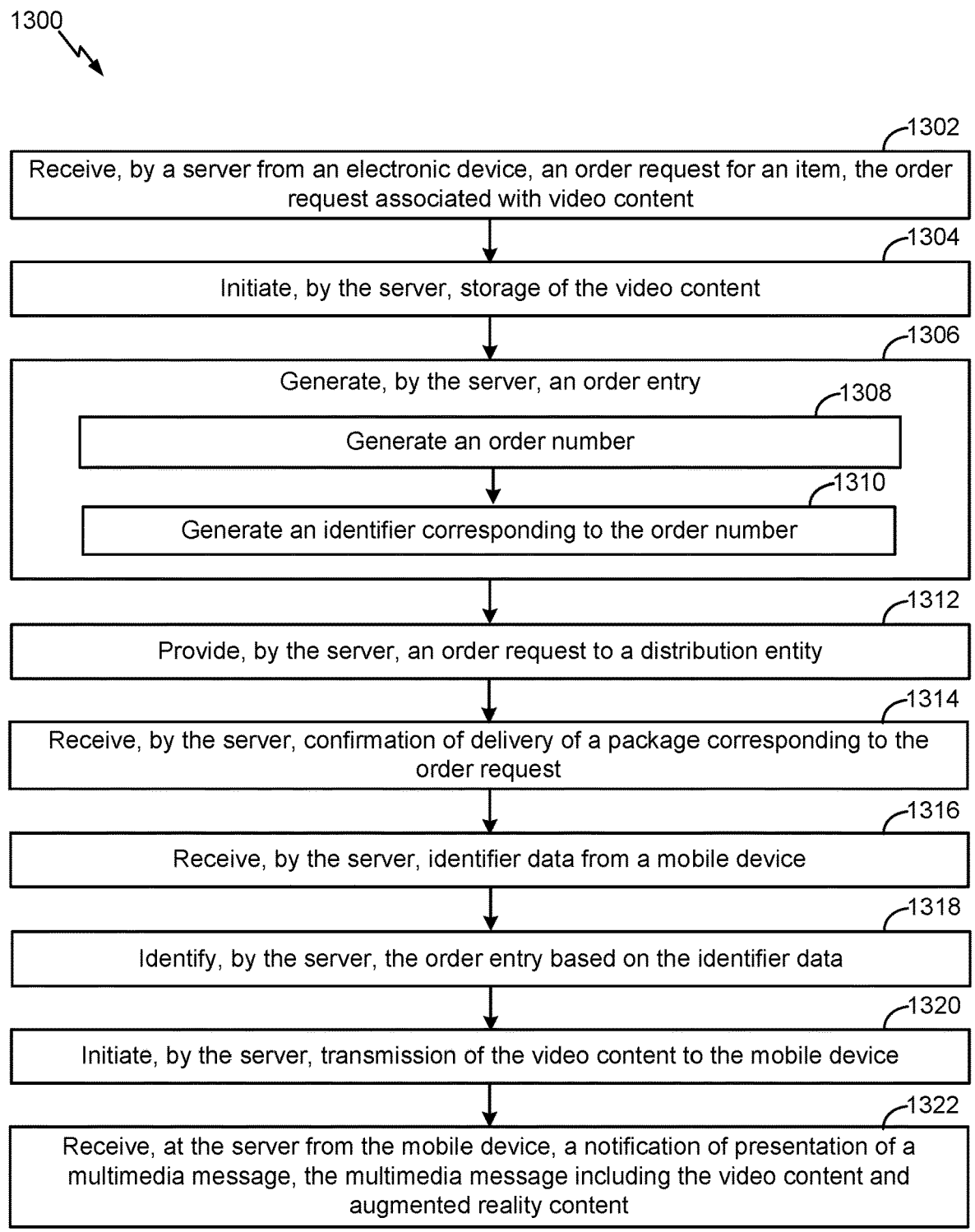
FIG. 13 illustrates a flow diagram of an example of a method of operating a server.

Referring to FIG. 13, a method 1300 of operating a server is shown. For example, method 1300 may be performed by server 130. Method 1300 may include receiving, by the server from an electronic device, an order request for an item, at 1302. For example, the order request may include or correspond to the order information 192 or order form 210. The electronic device may include or correspond to electronic device 110, mobile device 150, or electronic terminal 182. The order request may be associated with video content, such as video content 193.

Method 1300 may include initiating storage of the video content by the server, at 1304. To illustrate, the server may initiate storage of the video content at a memory, such as memory 136, that is accessible to the server. In some implementations, the server may receive the video content from a device, such as the electronic device that initiated the order request. In other implementations, the server may receive the video content from a manufacturer, provider, supplier, and/or distributor of the item, a delivery service or shipper of a package that includes the item, or another device or entity.

Method 1300 may include generating an order entry by the server, at 1306. For example, the order entry may include or correspond to entry 142. Generating (e.g., 1306) the order entry may include generating an order number, at 1308, generating an identifier corresponding to the order number, at 1310, or both. The order number may include or correspond to order number 310. The identifier may include or correspond to identifier 187, marker 188, or a combination thereof.

Method 1300 may include providing, by the server, an order request to a distribution entity, at 1312. For example, the order request may include or correspond to order request 195, and the distribution entity may include or correspond to distribution entity 180. Method 1300 may include receiving, by the server, confirmation of delivery of a package corresponding to the order request, at 1314. For example, the confirmation may include or correspond to delivery confirmation 196. In some implementations, the server may receive the confirmation from distribution entity 180 and/or may send the confirmation to a device, such as a device that initiated the order request.

Method 1300 may include receiving, by the server, identifier data from a mobile device, at 1316. For example, the identifier data may include or correspond to identifier data 197, and the mobile device may include or correspond to mobile device 150. The identifier data may include or correspond to identifier 187. Method 1300 includes identifying, by the server, the order entry based on the identifier data, at 1318. To illustrate, the server may identify and/or access entry 142 based on identifier data. Method 1300 further includes initiating, by the server, transmission of the video content to the mobile device, at 1320.

Method 1300 may also include receiving, at the server from the mobile device, a notification of presentation of a multimedia message, at 1322. For example, the notification may include or correspond to notification 198. The multimedia message may be associated with the order request and may include the video content and augmented reality content, such as 3D augmented reality content. To illustrate, multimedia message may include or correspond to mobile device content 199. In some implementations, the notification includes mobile device content 199. In such implementations, the server may provide the notification and/or the mobile device content 199 to a device, such as a device that initiated the order request. Thus, method 1300 describes operation of server (e.g., 130) to enable delivery of an ordered item to a recipient, delivery of multimedia content to the recipient, and notification of delivery of the multimedia content.

Figure 14:
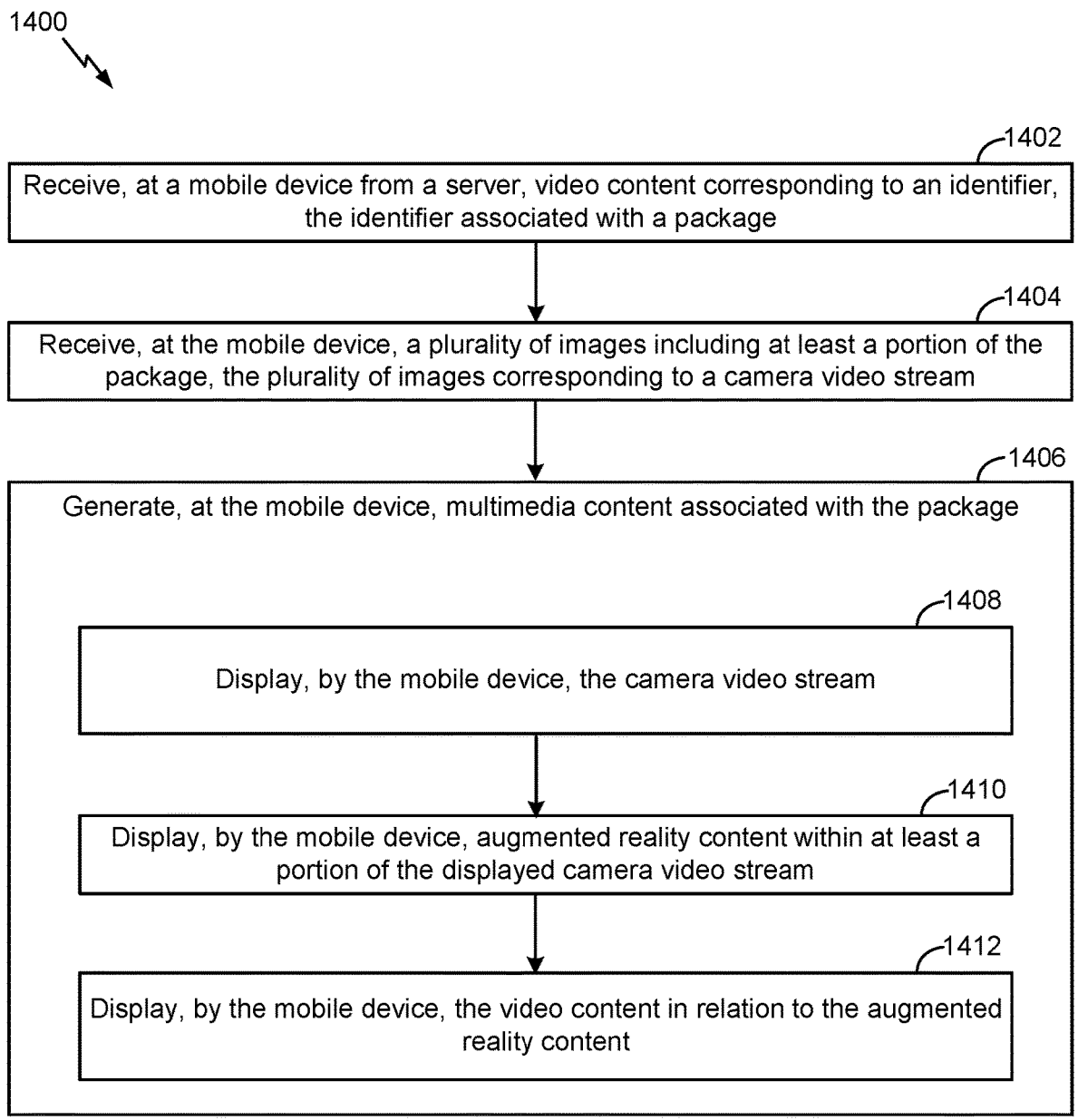
FIG. 14 illustrates a flow diagraph of an example of a method of operating a mobile device.

Referring to FIG. 14, a method 1400 of operating a server is shown. For example, method 1400 may be performed by electronic device 110, mobile device 150, or electronic terminal 182.

Method 1400 includes receiving, at a mobile device from a server, video content corresponding to an identifier, at 1402. For example, the server may include or correspond to server 130, and the video content may include the video content 193. The identifier may be associated with a package. To illustrate, the identifier may include or correspond to identifier 187 associated with package 186.

Method 1400 include receiving, at the mobile device, a plurality of images including at least a portion of the package, at 1404. The plurality of images may correspond to a camera video stream. For example, the plurality of images may include or correspond to the one or more images 170.

Method 1400 includes generating, at the mobile device, multimedia content associated with the package, 1406. Generating (e.g., 1406) may include displaying the camera video stream by the mobile device, at 1408. Generating (e.g., 1406) may also include displaying, by the mobile device, augmented reality content within at least a portion of the displayed camera video stream, at 1410, and displaying, by the mobile device, the video content in relation to the augmented reality content, at 1412. The augmented reality may include or correspond to AR content 162.

In some implementations, the multimedia content associated with the package may be generated at a different device, such as at server 103. In such implementations, the sever may transmit (e.g., stream) the multimedia content to the mobile device for presentation via a display.

Thus, method 1400 describes operation of a device (e.g., 110, 150) to enable delivery of a multimedia message that corresponds to delivery of a package (e.g., an item). The multimedia message may adventurously display AR content and video content in a live video stream generated by a camera of the device.

The operations described with reference to the methods of FIGS. 12-14 may be controlled by one or more a processing unit such as a central processing units (CPUs), controllers, field-programmable gate array (FPGA) devices, application-specific integrated circuits (ASICs), other hardware devices, firmware devices, or any combination thereof. It is noted that one or more operations described with reference to one of the methods of FIGS. 12-14 may be combined with one or more operations of another of FIGS. 12-14. For example, one or more operations of method 1200 may be combined with one or more operations of method 1300. As another example, one or more operations of method 1200 may be combined with one or more operations of method 1400.

Although one or more of the disclosed figures may illustrate systems, apparatuses, methods, or a combination thereof, according to the teachings of the disclosure, the disclosure is not limited to these illustrated systems, apparatuses, methods, or a combination thereof. One or more functions or components of any of the disclosed figures as illustrated or described herein may be combined with one or more other portions of another function or component of the disclosed figures. Accordingly, no single implementation described herein should be construed as limiting and implementations of the disclosure may be suitably combined without departing from the teachings of the disclosure.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein can be utilized according to the present examples. Accordingly, the appended claims are intended to include within their scope such processes, machines, manufacture, compositions of matter, means, methods, or steps.

The invention claimed is:

1. A method performed by a mobile device, the method comprising:
   receiving, based on identifier data, video content from a server, the identifier data based on an input;
   displaying three dimensional (3D) augmented reality content in a camera video stream that includes an object;
   displaying the video content on at least a portion of the 3D augmented reality content in the camera video stream, the video content associated with the object; and
   sending, to the server from which the video content is received, a notification.

2. The method of claim 1, further comprising:
   sending the identifier data to the server, the identifier data corresponding to the identifier; and
   displaying the camera video stream,
   wherein:
   displaying 3D augmented reality content in the camera video stream comprises displaying a first 3D augmented reality object, and
   the video content is displayed as overlaying at least a portion of the first 3D augmented reality object.

3. The method of claim 1, further comprising receiving the input, the received input including an image or a code, and wherein the video content comprises personalized video data submitted to the server by a third party.

4. The method of claim 1, wherein the notification comprises a display completion notification.

5. The method of claim 4, wherein the display completion notification is associated with completion of display of the 3D augmented reality content, the video content, or both.

6. The method of claim 1, wherein the camera video stream is received from a first camera of the mobile device, the method further comprising:
   recording the displayed camera video stream that includes the 3D augmented reality content and the video content and another camera video stream received from a second camera of the mobile device during display of the camera video stream that includes the 3D augmented reality content and the video content, or a combination thereof; and
   transmitting, to the server, the recorded displayed camera video stream that includes the 3D augmented reality content and the recorded other camera video stream.

7. The method of claim 1, further comprising:
   receiving the camera video stream from a first camera of the mobile device;
   receiving another camera video stream for a second camera of the mobile device;
   displaying the camera video stream and the other camera video stream concurrently via a display of the mobile device; and
   recording the displayed camera video stream that includes the 3D augmented reality content and the video content and the displayed other camera video stream.

8. The method of claim 1, further comprising:
   after displaying the video content on at least the portion of the 3D augmented reality content in the camera video stream, presenting an option for a reply message;
   based on the option, receiving an input to provide a reply message;
   receiving the reply message; and
   sending the reply message to the server.

9. The method of claim 1, wherein displaying the video content on at least a portion of the 3D augmented reality content in the camera video stream comprises:
   displaying a first video frame of the video content, the first video frame captured by a first camera pose of a camera of the mobile device; and
   displaying a second video frame of the video content, the second video frame captured by a second camera pose of the camera.

10. The method of claim 9, wherein the 3D augmented reality content is positioned and sized in relation to the first camera pose.

11. The method of claim 4, wherein the display completion notification is sent after completion of display of the 3D augmented reality content and the video content.

12. A mobile device comprising:
   a processor; and
   a memory storing one or more instructions that, when executed by the processor, cause the processor to:
   receive, based on the identified data, video content from a server, the identifier data based on an input;
   initiate display of three dimensional (3D) augmented reality content in a camera video stream that includes an object;

initiate display of the video content on at least a portion of the 3D augmented reality content in the camera video stream, the video content associated with the object; and initiate transmission, to the server from which the video content is received, a notification.

13. The mobile device of claim 12, further comprising:
a display coupled to the processor, the display configured to display the camera video stream, the 3D augmented reality content, and the video content; and
wherein the video content comprises personalized video data submitted to the server by a third party.

14. The mobile device of claim 12, further comprising:
a first camera configured to generate the camera video stream; and
a second camera configured to generate another camera video stream concurrently with the camera video stream,
wherein the other camera video stream includes a user of the device.

15. The mobile device of claim 12, wherein:
to display 3D augmented reality content in the camera video stream the one or more instructions, when executed by the processor, further cause the processor to initiate display of a first 3D augmented reality object; and
the video content is displayed as overlaying at least a portion of the first 3D augmented reality object.

16. The mobile device of claim 14, wherein the one or more instructions, when executed by the processor, further cause the processor to:
receive the camera video stream from a first camera of the mobile device;
receive another camera video stream for a second camera of the mobile device;
initiate display of the camera video stream and the other camera video stream concurrently via a display of the mobile device; and
record the displayed camera video stream that includes the 3D augmented reality content and the video content, the displayed other camera video stream, or a combination thereof.

17. A non-transitory computer-readable medium storing instructions that, when executed by one or more processors, cause the one or more processors to perform operations comprising:
receiving, based on identifier data, video content at a mobile device from a server, the identifier data based on an input received by the mobile device;
initiating display of three dimensional (3D) augmented reality content in a camera video stream that includes an object;
initiating display of the video content on at least a portion of the 3D augmented reality content in the camera video stream, the video content associated with the object; and
sending, to the server from which the video content is received, a notification.

18. The non-transitory computer-readable medium of claim 17, wherein the operations further include:
after displaying the video content on at least the portion of the 3D augmented reality content in the camera video stream, presenting an option for a reply message; and
responsive to the option, receiving an input to provide a reply message.

19. The non-transitory computer-readable medium of claim 18, wherein the operations further include:
receiving data associated with the reply message; and
sending the data to the server, wherein the data include text data, image data, audio data, or a combination thereof.

* * * * *

UNITED STATES PATENT AND TRADEMARK OFFICE
CERTIFICATE OF CORRECTION

PATENT NO. : 12,051,166 B2
APPLICATION NO. : 18/173456
DATED : July 30, 2024
INVENTOR(S) : Leon Chen, Brian Keffer and Jocelyn Seever It is certified that error appears in the above-identified patent and that said Letters Patent is hereby corrected as shown below:

In the Claims

In Claim 12, Column 26, Line 63, please replace "the identified" with --identifier--.

Signed and Sealed this
Twenty-fourth Day of September, 2024

Katherine Kelly Vidal
*Director of the United States Patent and Trademark Office*